(12) United States Patent
Kwok et al.

(10) Patent No.: US 10,843,336 B2
(45) Date of Patent: Nov. 24, 2020

(54) MAGNETIC ASSEMBLY OF SOFT ROBOTS WITH HARD COMPONENTS

(71) Applicant: President and Fellows of Harvard College, Cambridge, MA (US)

(72) Inventors: Sen Wai Kwok, Watertown, MA (US); Stephen A. Morin, Lincoln, NE (US); Bobak Mosadegh, New York, NY (US); Ju-Hee So, Seoul (KR); Robert F. Shepherd, Brooktondale, NY (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 16 days.

(21) Appl. No.: 15/974,444

(22) Filed: May 8, 2018

(65) Prior Publication Data
US 2018/0326578 A1 Nov. 15, 2018

Related U.S. Application Data

(62) Division of application No. 14/768,389, filed as application No. PCT/US2014/020415 on Mar. 4, 2014, now Pat. No. 9,962,832.
(Continued)

(51) Int. Cl.
*B25J 9/14* (2006.01)
*B25J 9/08* (2006.01)
(Continued)

(52) U.S. Cl.
CPC ............... *B25J 9/14* (2013.01); *B23P 19/04* (2013.01); *B25J 9/08* (2013.01); *B25J 9/142* (2013.01);
(Continued)

(58) Field of Classification Search
CPC ....... B25J 9/08; B25J 9/14; B25J 9/142; B25J 15/0023; B25J 15/0608; B25J 15/12;
(Continued)

(56) References Cited

U.S. PATENT DOCUMENTS

| 2,891,139 A | 6/1959 | Wass et al. |
| 3,284,964 A | 11/1966 | Saito |

(Continued)

FOREIGN PATENT DOCUMENTS

| DE | 19617852 A1 | 10/1997 |
| DE | 102009029972 A1 | 12/2010 |

(Continued)

OTHER PUBLICATIONS

Albu-Schäffer, A. et al., "Soft Robotics," IEEE Robotics & Automation Magazine, vol. 15, pp. 20-30 (Sep. 2008).
(Continued)

*Primary Examiner* — Christopher M Koehler
(74) *Attorney, Agent, or Firm* — Wilmer Cutler Pickering Hale and Dorr LLP

(57) ABSTRACT

Reconfigurable soft robotic actuators with hard components are described. Magnetic attraction is used to couple flexible molded bodies capable of actuation upon pressurization with other flexible molded bodies and/or with hard components (e.g., frames and connectors) to form a seal for fluidic communication and cooperative actuation. Pneumatic de-coupling chambers built into the hard components to de-couple the hard components from the magnetically-coupled soft molded bodies are described. The use of magnetic self-alignment coupling and pneumatic de-coupling allows for the remote assembly and disassembly of complex structures involving hard and soft components. The magnetic
(Continued)

coupling allows for rapid, reversible reconfiguration of hybrid soft-hard robots for repair, testing new designs, and carrying out new tasks.

2 Claims, 25 Drawing Sheets

Related U.S. Application Data

(60) Provisional application No. 61/772,183, filed on Mar. 4, 2013.

(51) Int. Cl.
  B25J 15/12 (2006.01)
  B62D 57/032 (2006.01)
  B23P 19/04 (2006.01)
  B25J 15/00 (2006.01)
  A63H 3/46 (2006.01)
  B25J 15/06 (2006.01)

(52) U.S. Cl.
  CPC .......... B25J 15/0023 (2013.01); B25J 15/12 (2013.01); B62D 57/032 (2013.01); A63H 3/46 (2013.01); B25J 15/0608 (2013.01); Y10S 901/27 (2013.01); Y10S 901/37 (2013.01); Y10S 901/39 (2013.01)

(58) Field of Classification Search
  CPC ......... B23P 19/04; B62D 57/032; A63H 3/46; Y10S 901/27; Y10S 901/37; Y10S 901/39
  See application file for complete search history.

(56) References Cited

U.S. PATENT DOCUMENTS

| | | |
|---|---|---|
| 3,343,864 A | 9/1967 | James |
| 3,574,386 A | 4/1971 | Frost |
| 3,594,232 A | 7/1971 | Spahrbier |
| 3,601,442 A | 8/1971 | Orndorff |
| 3,713,685 A | 1/1973 | Ewing |
| 3,924,519 A | 12/1975 | England |
| 3,981,528 A | 9/1976 | Andorf et al. |
| 3,987,528 A | 10/1976 | Zemek et al. |
| 4,029,072 A | 6/1977 | Goto et al. |
| 4,337,921 A | 7/1982 | Edwards |
| 4,344,404 A | 8/1982 | Child et al. |
| 4,535,225 A | 8/1985 | Wolf et al. |
| 4,751,869 A | 6/1988 | Paynter |
| 4,784,042 A | 11/1988 | Paynter |
| 4,815,782 A | 3/1989 | Craig et al. |
| 4,928,926 A | 5/1990 | Bloemendal et al. |
| 4,976,191 A | 12/1990 | Suzumori et al. |
| 4,995,493 A * | 2/1991 | Cotsman ............ B25J 15/0491 192/150 |
| 5,018,506 A | 5/1991 | Danna et al. |
| 5,020,964 A | 6/1991 | Hyatt et al. |
| 5,021,064 A | 6/1991 | Caines |
| 5,080,000 A | 1/1992 | Bubic et al. |
| 5,083,498 A | 1/1992 | Sato et al. |
| 5,156,081 A | 10/1992 | Suzumori |
| 5,251,538 A | 10/1993 | Smith |
| 5,317,952 A | 6/1994 | Immega |
| 5,327,038 A | 7/1994 | Culp |
| 5,381,563 A | 1/1995 | Isabelle et al. |
| 5,385,080 A | 1/1995 | Suzumori |
| 5,568,957 A | 10/1996 | Haugs |
| 5,619,993 A | 4/1997 | Lee |
| 5,654,595 A | 8/1997 | Ferguson |
| 5,697,285 A | 12/1997 | Nappi et al. |
| 5,833,291 A | 11/1998 | Haugs |
| 5,865,063 A | 2/1999 | Sheldon |
| 6,052,992 A | 4/2000 | Eroshenko |
| 6,125,492 A | 10/2000 | Prowse |
| 6,178,872 B1 | 1/2001 | Schulz |
| 6,718,766 B2 | 4/2004 | Seto et al. |
| 6,732,015 B2 | 5/2004 | Maeda |
| 6,772,673 B2 | 8/2004 | Seto et al. |
| 7,086,322 B2 | 8/2006 | Schulz |
| 7,258,379 B2 | 8/2007 | Ono et al. |
| 7,327,067 B2 | 2/2008 | Ishibashi et al. |
| 7,331,273 B2 | 2/2008 | Kerekes et al. |
| 7,617,762 B1 | 11/2009 | Ragner |
| 7,654,595 B2 | 2/2010 | Yokoyama et al. |
| 9,464,642 B2 | 10/2016 | Ilievski et al. |
| 9,945,397 B2 | 4/2018 | Shepherd et al. |
| 9,981,377 B2 | 5/2018 | Morin et al. |
| 2002/0108491 A1 | 8/2002 | Stahn |
| 2002/0157388 A1 | 10/2002 | Seto et al. |
| 2003/0226355 A1 | 12/2003 | Simburger |
| 2004/0050247 A1 | 3/2004 | Topping |
| 2004/0118366 A1 | 6/2004 | Kluge |
| 2004/0267331 A1 | 12/2004 | Koeneman et al. |
| 2005/0282462 A1 | 12/2005 | Panec et al. |
| 2006/0000214 A1 | 1/2006 | Pelrine et al. |
| 2006/0028041 A1 | 2/2006 | Ono et al. |
| 2009/0301073 A1 | 12/2009 | Mueller et al. |
| 2014/0010628 A1* | 1/2014 | Ruschulte ............ B25J 15/0023 414/800 |
| 2014/0109560 A1 | 4/2014 | Ilievski et al. |
| 2017/0097021 A1 | 4/2017 | Ilievski et al. |

FOREIGN PATENT DOCUMENTS

| | | |
|---|---|---|
| EP | 0146261 A1 | 6/1985 |
| EP | 1190819 A1 | 3/2002 |
| EP | 1319845 A2 | 6/2003 |
| GB | 2296941 A | 7/1996 |
| JP | S47-6663 | 4/1972 |
| JP | 49-26272 | 3/1974 |
| JP | H02-134465 A | 5/1990 |
| JP | H05-69361 A | 3/1993 |
| JP | 8-323676 | 12/1996 |
| JP | 2001-096482 A | 4/2001 |
| JP | 2005-083447 A | 3/2005 |
| JP | 2006204612 A | 8/2006 |
| JP | 2008-023076 A | 2/2008 |
| JP | 2010-214474 A | 9/2010 |
| WO | WO-98/49976 A1 | 11/1998 |
| WO | WO-0179707 A1 | 10/2001 |
| WO | WO-2006036067 A2 | 4/2006 |
| WO | WO-2006080088 A1 | 8/2006 |
| WO | WO-2012/148472 A2 | 11/2012 |
| WO | WO-2012150551 A1 | 11/2012 |

OTHER PUBLICATIONS

Bar-Cohen, et al., "Low-mass Muscle Actuators using electroactive polymers (EAP)", Proceedings of SPIE's 5th Annual International Symposium on Smart Structures and Materials, Mar. 1-5, 1998, San Diego, CA. Paper No. 3324-32 (6 pages).

Brown, et al., "Universal robotic gripper based on the jamming of granular material" and "Universal Robotic Gripper based on the Jamming of Granular Material: Supplementary Material" PNAS, vol. 107, No. 44, pp. 18809-18814, 12 pages (Nov. 2010).

Cardinal Patentability Search Report, Soft Robotic Actuators, Prepared Nov. 4, 2011 (12 pages).

Chiechi, R. C. et al., "Eutectic Gallium-Indium (EGaIn): A Moldable Liquid Metal for Electrical Characterization of Self-Assembled Monolayers," Angewandte Chemie, vol. 47, pp. 142-144, Apr. 21, 2008.

Chou, et al., "Measurement and Modeling of McKibben Pneumatic Artificial Muscles", IEEE Transactions on Robotics and Automation, 12(1):90-102, Feb. 1996, 13 pages.

Correll, N. et al., "Soft Autonomous Materials—Using Active Elasticity and Embedded Distributed Computation", 12th International Symposium on Experimental Robotics, Delhi, India, Dec. 18-21, 2010 (14 pages).

Daerden et al., "Pneumatic Artificial Muscles: actuators for robotics and automation", Vrije Universiteit Brussel, Department of Mechani-

(56) References Cited

OTHER PUBLICATIONS cal Engineering, European Journal of Mechanical and Environmental Engineering, Mar. 2000 (13 pages).
European Search Report dated Jan. 31, 2018 in European Application No. 14759711.6, 8 pages.
Fu, Y. et al., "Design, fabrication and testing of piezoelectric polymer PVDF microactuators," Smart Materials and Structures, vol. 15, No. 1, pp. S141-S146, 8 pages (Feb. 2006).
Fujiwara, et al., "Linear Expansion and Contraction of Paired Pneumatic Baloon Bending Actuators Toward Telescopic Motion", 22th IEEE Int. Conf. on Micro Electro Mechanical Systems ( MEMS Jan. 26-29, 2009 ), Sorrento, Italy (1 page).
Galloway, Kevin C., "Soft Actuator Prior Art Survey," Dec. 12, 2012 (34 pages).
Garcia et al., "A Vacuum-Based Bonding Mechanism for Modular Robotics", IEEE Transactions on Robotics, Oct. 6, 2011, vol. 27, No. 5, pp. 876-890.
Goldfarb, M. et al., "Design and Energetic Characterization of a Liquid-Propellant-Powered Actuator for Self-Powered Robots," IEEE/ASME Transactions on Mechatronics, vol. 8, No. 2, pp. 254-262 (Jun. 2003).
Hamlen, R. P., et al., "Electrolytically Activated Contractile Polymer," Nature, vol. 206, No. 4989, pp. 1149-1150 (Jun. 12, 1965).
Ilievski et al., "Soft Robotics for Chemists," Angew. Chem, Int. Ed. vol. 50, Jan. 20, 2011, pp. 1890-1895.
International Search Report and Written Opinion for International Application No. PCT/US2013/032297 dated Sep. 30, 2013. 14 pages.
International Search Report and Written Opinion for International Patent Application No. PCT/US2011/061720 dated May 8, 2013. 9 pages.
International Search Report and Written Opinion issued by the European Patent and Trademark Office as International Searching Authority for International Application No. PCT/US2012/034772 dated Jul. 23, 2012 (9 pages).
International Search Report and Written Opinion issued by the European Patent Office as International Searching Authority for International Application No. PCT/US2013/022593 dated May 7, 2013 (10 pages).
International Search Report and Written Opinion issued by the European Patent Office as International Searching Authority for International Application No. PCT/US2013/028250 dated Aug. 30, 2013 (19 pages).
International Search Report and Written Opinion issued by the U.S Patent and Trademark Office as International Searching Authority for International Application No. PCT/US2012/059226 dated Jun. 19, 2013 (12 pages).
International Search Report and Written Opinion dated Jul. 18, 2014, in the International Application No. PCT/US2014/020415, filed Mar. 4, 2014, 16 pages.
Kazerooni, H., "Design and Analysis of Pneumatic Force Generators for Mobile Robotic Systems," IEEE/ASME Transactions on Mechatronics, vol. 10, No. 4, pp. 411-418 (Aug. 2005).
Keplinger, C. et al., "Rontgen's electrode-free elastomer actuators without electromechanical pull-in instability," PNAS, vol. 107, No. 10, pp. 4505-4510 (Mar. 9, 2010).
Kim, et al., "Micro artificial muscle fiber using NiTi spring for soft robotics", The 2009 IEEE/RSJ International Conference on Intelligent Robots and Systems, Oct. 11-15, 2009 St. Louis, USA, 2228-2234 (7 pages).
Kim, et al., "Manufacturing of Inchworm Robot Using Shape Memory Alloy (SMA) Embedded Composite Structure", International Journal of Precision Engineering and Manufacturing, 12(3):565-568, Jun. 2011, 4 pages.
Konishi, et al., "Merging micro and macro robotics toward micro manipulation for biomedical operation", Proceedings of the 36th International Symposium on Robotics, Nov. 29-Dec. 1, 2005 (6 pages).

Konishi, S. et al., "Fluid-Resistive Bending Sensor Compatible with a Flexible Pneumatic Balloon Actuator," Journal of Robotics and Mechatronics, vol. 20, No. 3, pp. 436-437 (Jan. 24, 2008).
Kuhn, W. and Hargitay, B., "Reversible Dilation and Contraction by Changing the State of Ionization of High-Polymer Acid Networks," Nature, vol. 165, pp. 514-516 (Apr. 1, 1950).
Laschi, C. et al., "Design of a biomimetic robotic octopus arm", Bioinspiration & Biomimetics, vol. 4, No. 1, 9 pages (Mar. 2009).
Lee, et al., "First Jump of Microgel: Actuation Speed Enhancement by Elastic Instability", Soft Matter, Aug. 11, 2010, vol. 6, pp. 4342-4345.
Marchese, et al., "Soft Robot Actuators using Energy-Efficient Valves Controlled by Electropermanent Magnets", IEEE/RSJ International Conference on Intelligent Robots and Systems, IEEE pp. 756-761, Sep. 25-30, 2011.
Martinez et al., "Robotic Tentacles with Three-Dimensional Mobility Based on Flexible Elastomers," Advanced Materials, vol. 25, Issue 2, Jan. 11, 2013, pp. 205-212.
Martinez, et al., "Elastomeric Origami: Programmable Paper-Elastomer Composites as Pneumatic Actuators", Advanced Functional Materials, 22:1376-1384, Feb. 2012, 9 pages.
Micro/Nano Mechatronics LAB., "Fluid-Resistive Bending Sensor Having Perfect Compatibility with Flexible Pneumatic Balloon Actuator", Group Robotics Ritsumeikan University (1 page) (Jan. 21-25, 2007).
Morin, et al., "Camouflage and Display for Soft Machines," Science, vol. 337, Aug. 17, 2012, pp. 828-832.
Mosadegh, B. et al., "Integrated elastomeric components for autonomous regulation of sequential and oscillatory flow switching in microfluidic devices," Nature Physics, Apr. 18, 2010, vol. 6, pp. 433-437.
Mosadegh, B. et al., "Pneumatic Networks for Soft Robotics that Actuate Rapidly," Adv. Funct. Mater. (2013), first published Jan. 10, 2014, vol. 24, No. 15, 20 pages.
Mosadegh, et al., "Rapidly Actuating Pneumatic Networks for Soft Robotics", Department of Chemistry and Chemical Biology, Harvard University, Feb. 14, 2013 (25 pages).
Nakajima, et al., "Timing and Behavioral Efficiency in Controlling a Soft Body: A Case Study in Octopus Reaching Behavior," The 2nd International Conference on Morphological Computation, Sep. 12-14, 2011, (3 pages).
Oh et al., "Topical Review: A review of microvalves," Journal of Micromechanics and Microengineering, Mar. 24, 2006, vol. 16, pp. R13-R39.
Onal, et al, "Soft mobile robots with on-board chemical pressure generation", 15th International Symposium on Robotics Research, Flagstaff, AZ—Aug. 28-Sep. 1, 2011 (16 pages).
Osada, et al., "Soft and Wet Materials: Polymer Gels", Advanced Materials 10(11):827-837, Aug. 1998 (11 pages).
Otake, et al., "Motion design of a starfish-shaped gel robot made of electro-active polymer gel", Robotics and Autonomous Systems 40:185-191, Aug. 31, 2002 (7 pages).
Pelrine, R. et al., "High-Speed Electrically Actuated Elastomers with Strain Greater Than 100%," Science, vol. 287, No. 5454, pp. 836-839 (Feb. 4, 2000).
Pritts, M.B. et al., "Design of an Artificial Muscle Continuum Robot," Proceedings of the 2004 IEEE, International Conference on Robotics & Automation, New Orleans, LA, pp. 4742-4746 (Apr. 2004).
Qin L. et al., "Self-powered microfluidic chips for multiplexed protein assays from whole blood," Author Manuscript: Lab Chip, vol. 9, No. 14, pp. 2016-2020, 11 pages (Jul. 21, 2009).
Rahn, Christopher D., "Biologically Inspired Design of Soft Robotic Manipulators," Biodynotics, Biologically Inspired Dynamic Robotics Presentation, 32 pages (No date listed).
Richards, A. W. and Odegard, G. M., "Constitutive Modeling of Electrostrictive Polymers Using a Hyperelasticity-Based Approach," Journal of Applied Mechanics, vol. 77, pp. 014502-1-014502-5 (Jan. 2010).
Salem, I. A. et al., "Kinetics and Mechanisms of Decomposition Reaction of Hydrogen Peroxide in Presence of Metal Complexes," Int. J. Chem. Kinet., vol. 32, pp. 643-666 (Sep. 18, 2000).

(56) References Cited

OTHER PUBLICATIONS

Shepherd et al., "Multigait soft robot," Proc. Natl. Acad. Sci. U.S.A., Dec. 20, 2011, vol. 108, No. 51, pp. 20400-20403.
Shepherd, et al., "Using Explosions to Power a Soft Robot", Angew. Chem. Int. Ed., 52:2892-2896, No Month Given 2013, 5 pages.
Shi, et al., "A Novel Soft Biomimetic Microrobot with Two Motion Attitudes", Sensors, 12:16732-16758, Dec. 6, 2012, 27 pages.
Steltz, et al, "JSEL: Jamming Skin Enabled Locomotion", The 2009 IEEE/RSJ International Conference on Intelligent Robots and Systems Oct. 11-15, 2009 St. Louis, USA (6 pages).
Suzumori, "Elastic materials producing compliant robots", Robotics and Autonomous Systems 18:135-140, 1996 (6 pages).
Symposium L—NEMS/MEMS Technology and Devices, International Conference on Materials for Advanced Technologies 2009 and International Union of Materials Research Societies—International Conference in Asia 2009, Jun. 28-Jul. 3, 2009, Singapore (60 pages).
Thorsen, T. et al., "Microfluidic Large-Scale Integration," Science, vol. 298, pp. 580-584 (Oct. 18, 2002).
Trivedi, D. et al., "Soft Robotics: Biological inspiration, state of the art, and future research," Applied Bionics and Biomechanics, vol. 5, No. 3, pp. 99-117, 20 pages (Sep. 2008).
Trivedi, et al., "Geometrically exact dynamic models for soft robotic manipulators", Proceedings of the 2007 IEEE/RSJ International Conference on Intelligent Robots and Systems, San Diego, CA, USA, Oct. 29-Nov. 2, 2007 (6 pages).
Vitale, F. et al., "Low-temperature H2O2-powered actuators for biorobotics: Thermodynamic and kinetic analysis," 2010 IEEE International Conference on Robotics and Automation, Anchorage, AK, pp. 2197-2202 (May 3-8, 2010).
Wait, K. W. et al., "Self locomotion of a spherical rolling robot using a novel deformable pneumatic method," 2010 IEEE International Conference on Robotics and Automation, Anchorage, AK, pp. 3757-3762 (May 3-8, 2010).
Wakimoto, et al., "Miniature Pneumatic Curling Rubber Actuator Generating Bidirectional Motion with One Air-Supply Tube", Advanced Robotics, 25:1311-1330, (2011), accessed Aug. 21, 2014, 20 pages.
Wang et al., "Towards 'Soft' Self-Reconfigurable Robots," The Fourth IEEE RAS/EMBS International Conference on Biomedical Robotics and Biomechatronics, Rome, Italy, Jun. 24-27, 2012, published in IEEE Aug. 31, 2012, pp. 593-598.
Wang, Y. et al., "Bipolar Electrochemical Mechanism for the Propulsion of Catalytic Nanomotors in Hydrogen Peroxide Solutions," Langmuir, Dec. 1, 2006, vol. 22, No. 25, pp. 10451-10456.
Whitehead, John C., "Hydrogen Peroxide Propulsion for Smaller Satellites," 12th AIAA/USU Conference on Small Satellites, SSC98-VIII-1, pp. 1-13 (Sep. 1998).

\* cited by examiner

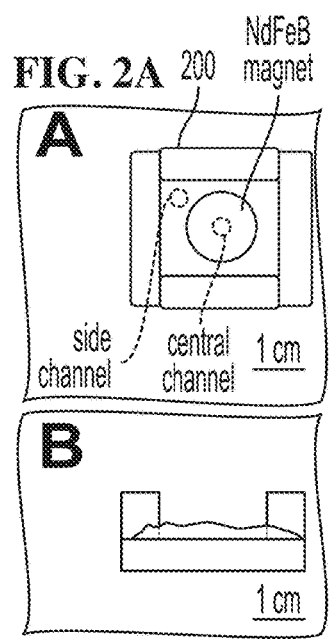
FIG. 2A
FIG. 2B
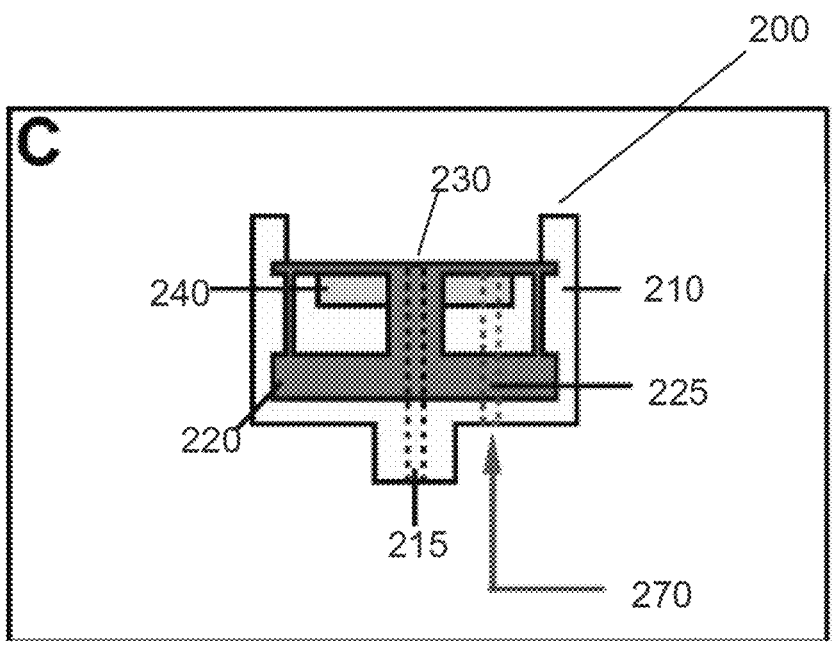
FIG. 2C
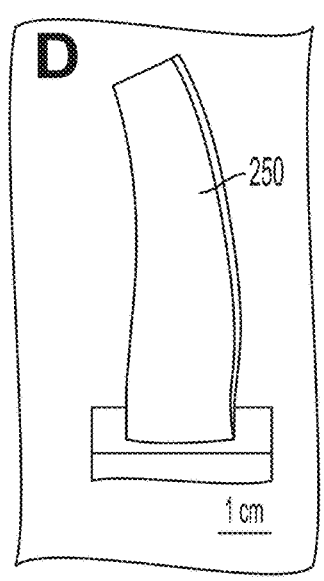
FIG. 2D
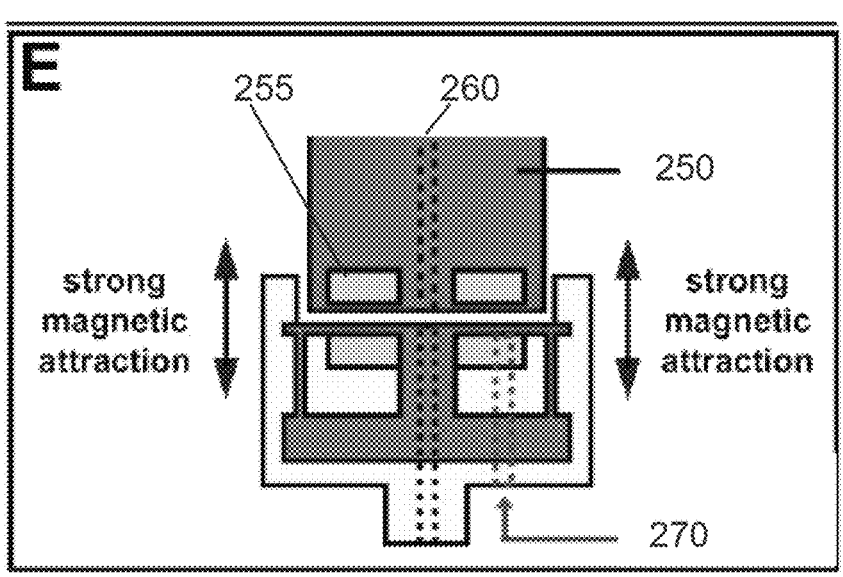
FIG. 2E

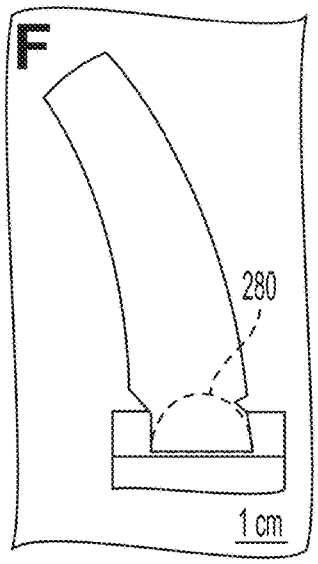
FIG. 2F
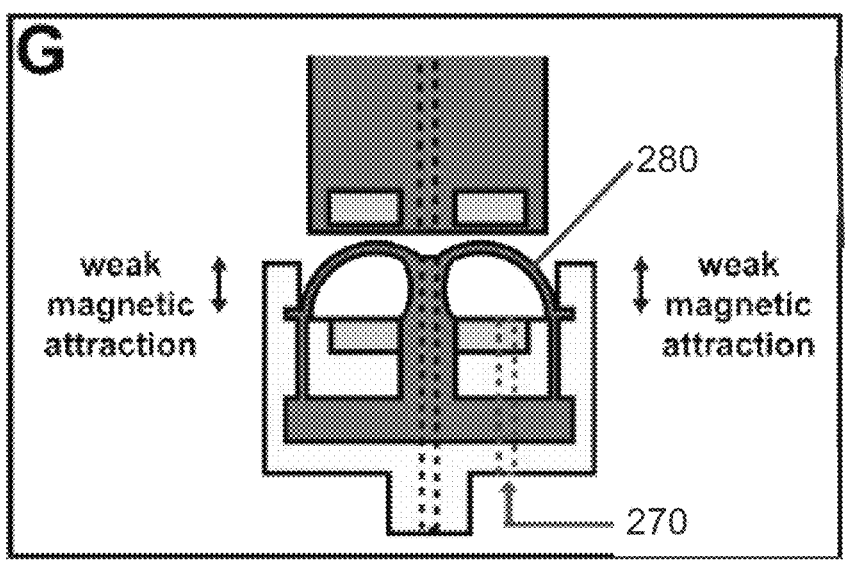
FIG. 2G
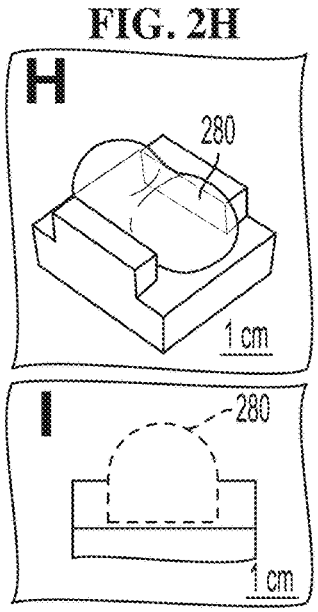
FIG. 2H
FIG. 2I
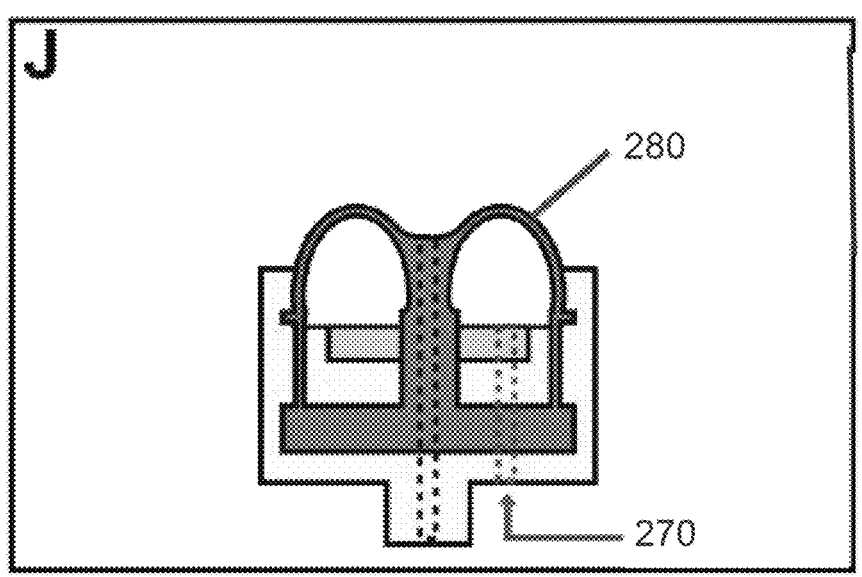
FIG. 2J

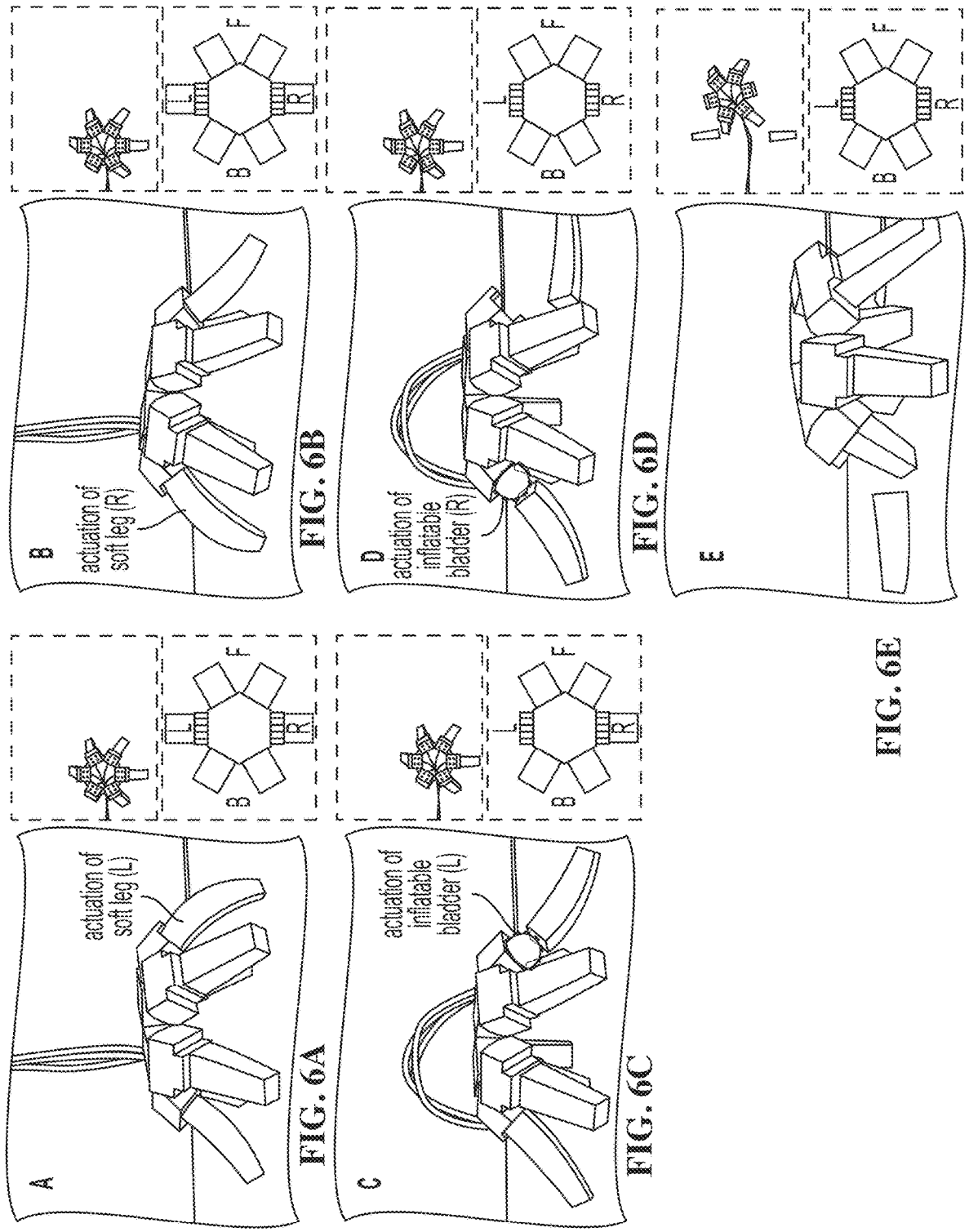

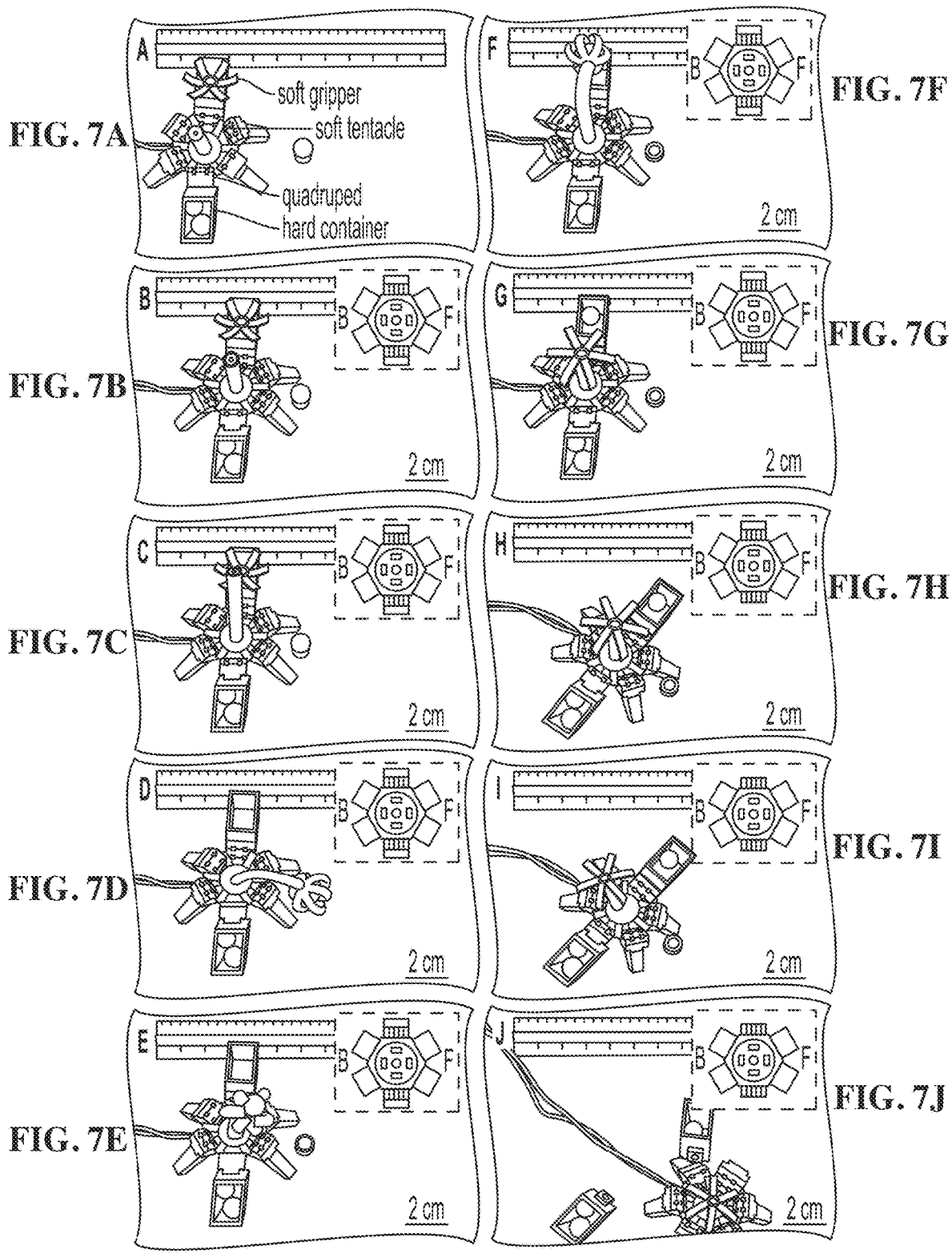

FIG. 8C
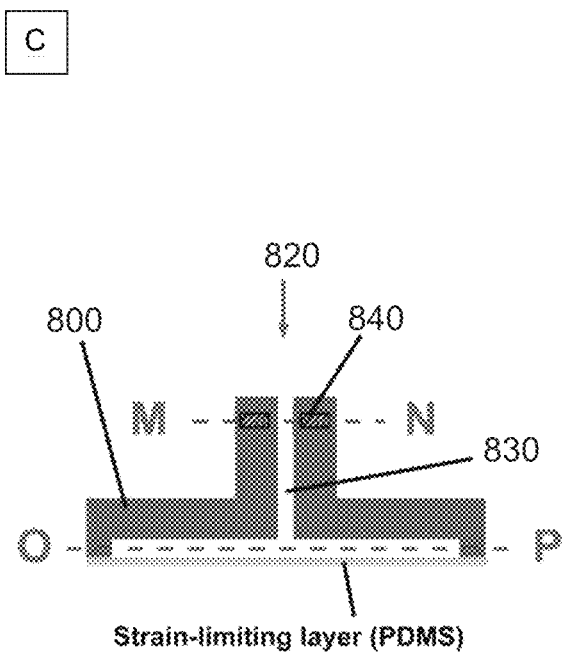
FIG. 8A
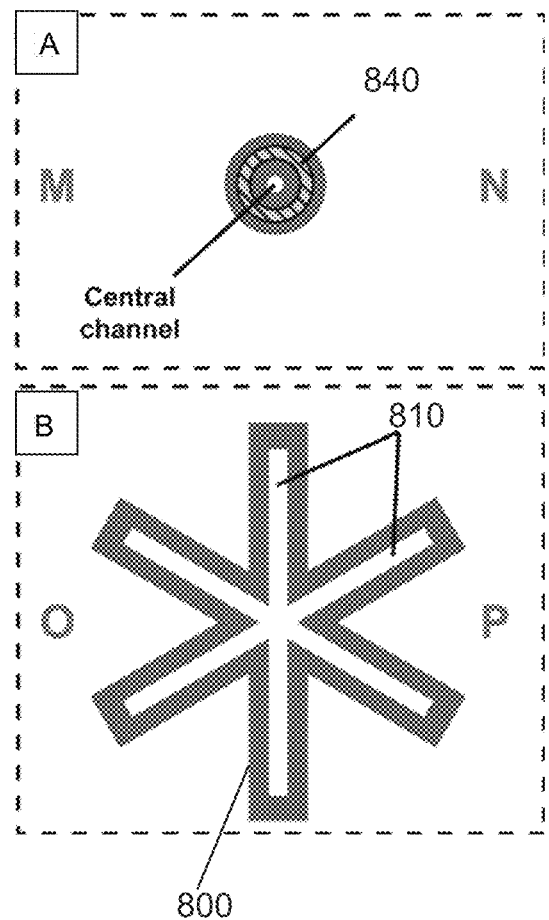
FIG. 8B

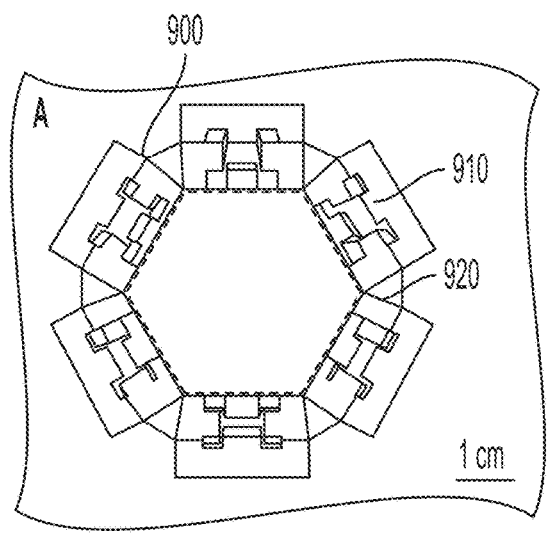
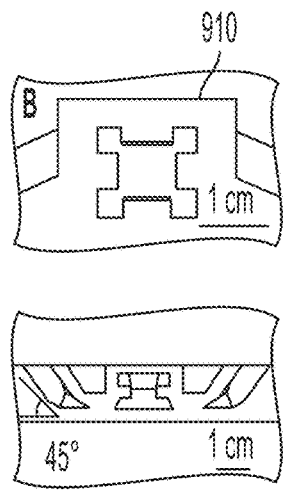
FIG. 9B
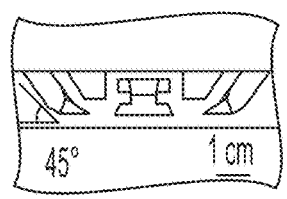
FIG. 9C
FIG. 9A
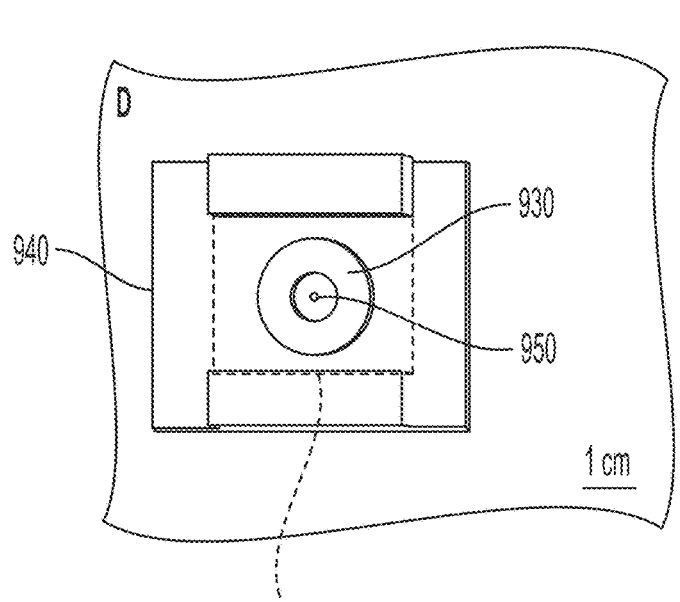
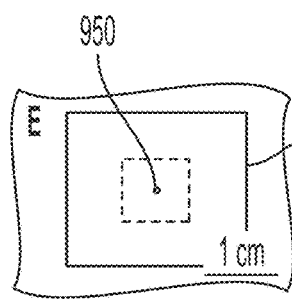
FIG. 9E
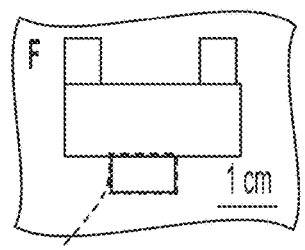
FIG. 9F
FIG. 9D

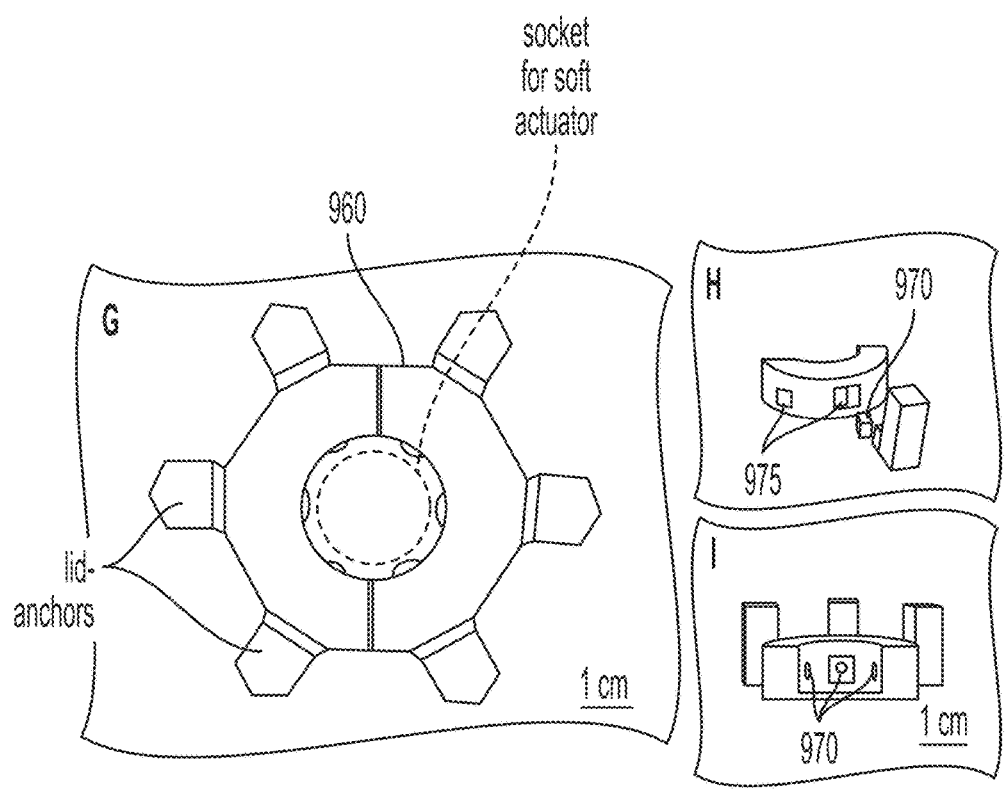
FIG. 9G
FIG. 9H
FIG. 9I
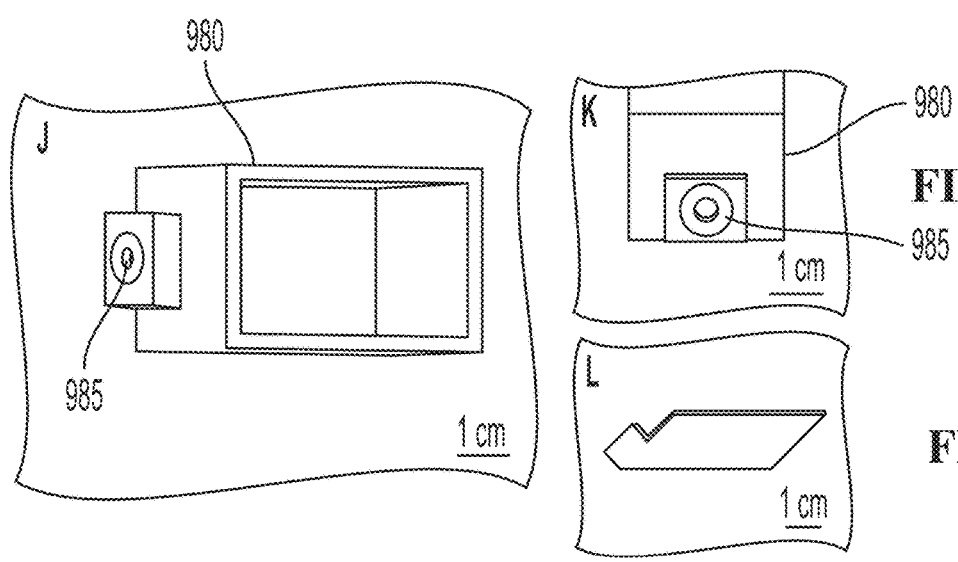
FIG. 9J
FIG. 9K
FIG. 9L

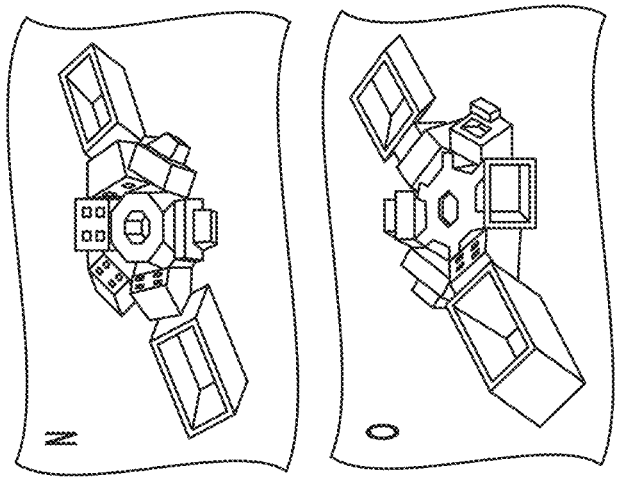
FIG. 9N
FIG. 9O
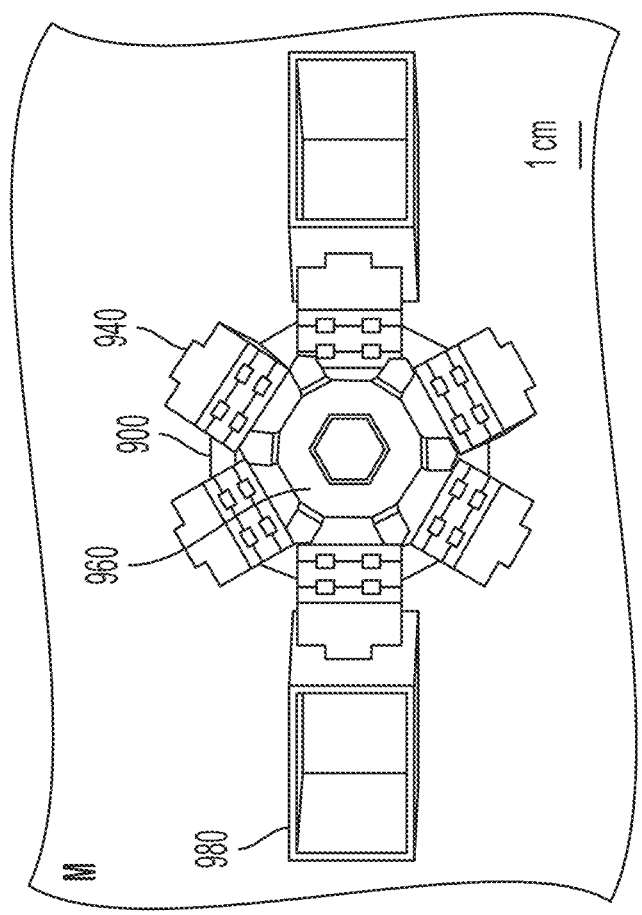
FIG. 9M

FIG. 16A 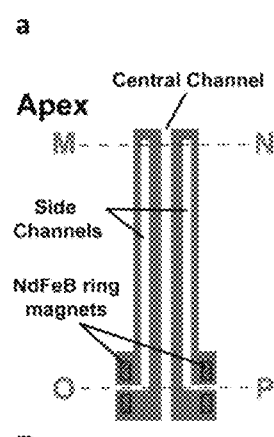 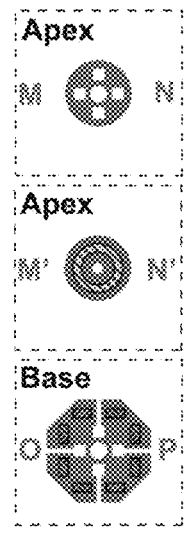 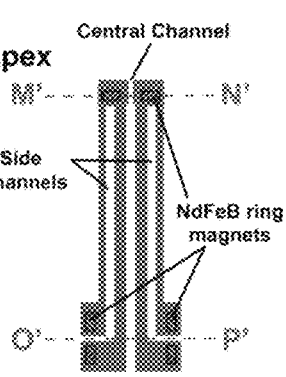 FIG. 16B
FIG. 16C 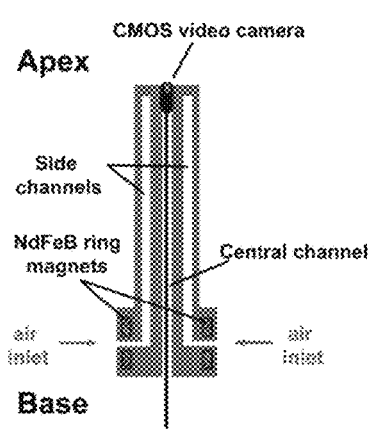 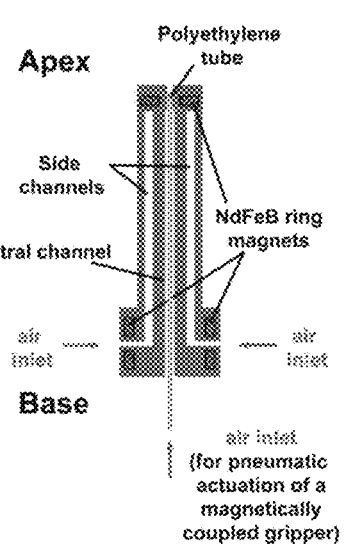 FIG. 16D

MAGNETIC ASSEMBLY OF SOFT ROBOTS WITH HARD COMPONENTS

RELATED APPLICATIONS

This application is a divisional of U.S. Non-Provisional patent application Ser. No. 14/768,389, entitled "MAGNETIC ASSEMBLY OF SOFT ROBOTS WITH HARD COMPONENTS," filed Aug. 17, 2015, which is a national phase application, submitted under 35 U.S.C. § 371, of International Application No. PCT/US2014/020415, filed on Mar. 4, 2014, and which claims the benefit of priority under 35 U.S.C. § 119(e) to U.S. Application No. 61/772,183, filed Mar. 4, 2013. All of the above-mentioned patent applications are hereby incorporated herein by reference in their entireties.

STATEMENT REGARDING FEDERALLY SPONSORED RESEARCH OR DEVELOPMENT

The present invention was made with United States government support under Grant W911NF-11-1-0094 awarded by the DARPA. The United States government has certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

This technology relates to reconfigurable flexible actuators with hard components. In particular, this invention relates to the combination of soft robotic manipulators with hard modular components.

An example of a "robot" is an automatically controlled, programmable, multipurpose manipulator. A robot can perform its function at a fixed location, or in motion. Robotics is a field of enormous (and growing) importance, in fields from assembly to surgery.

Most robotic systems are "hard", that is, composed of metallic structures with joints based on conventional bearings. These structures are often modeled after animal limbs (although structures not found in nature—for example, wheels and treads—are also common in mobile robots).

Soft robotic actuators find inspiration in nature. For example, animals without skeletons (such as squid and starfish) present new opportunities in robotic structures, and offer solutions to problems such as the gripping of soft or fragile objects that are challenging to address with hard robots. The mechanisms of actuation and locomotion used by squid and other invertebrates often rely on elastomeric (e.g. "soft") structures and on actuation elements (e.g. hydrostats) that are uncommon in vertebrates. Soft actuators use pneumatic or hydraulic systems for movement, provide biomimetic and non-biomimetic structures for actuation, gripping, sensing, locomotion, and other functions.

Over the last several years, soft robotic manipulators have generated significant interest due to their wide range of potential applications that are challenging for "hard" robots. For example, soft robots can handle delicate objects such as eggs because the surface of soft robots can conform to the shape of the handled objects. Soft robots can also fit into places that are challenging for hard robots. For instance, a soft robot can fit under a door jam by deflating itself. In addition, soft robots can move in an environment that are challenging for hard robots. For instance, soft robots can maneuver on non-stiff surfaces, such as mud, clay, gels, or in fluids such as water.

Soft robots such as grippers and tentacles can execute highly sophisticated motions without elaborate sensor-feedback system. Complex motions exhibited by soft robots can be initiated by a single pneumatic input and can be pre-programmed by the combination of elastomers and the geometry of the pneumatic networks present in these elastomeric devices. These robots are inexpensive to fabricate by soft lithography and are well suited for handling fragile objects (e.g., uncooked eggs).

Soft lithography can be used to fabricate the soft robots because this technique enables rapid prototyping and replication of internal pneumatic networks. Although these soft robots (e.g., grippers, walkers, and tentacles) with planar or simple body plans can be rapidly fabricated from silicone elastomers using soft lithography, these robots are not easily reconfigurable.

In addition, expanding the capability of soft robots for the fabrication of advanced robotic systems demands integration of composite materials (e.g., thermoplastics, metals) or implementation of complex three-dimensional pneumatic networks that are difficult to mold directly in a single step using soft lithography alone. Many characteristics (e.g., high rigidity, high thermal conductivity, and strong resistance against abrasion) of hard materials are difficult, if not impossible, to replicate using soft or flexible materials. Methods such as computer-numeric-control milling (CNC) or injection-molding can be used for the fabrication of modules made of metal or rigid plastics. 3D printing is advantageous for prototyping hard thermoplastics because it enables rapid fabrication of units that have complicated internal network of three-dimensional channels.

Various methods (e.g., chemical, mechanical, magnetic) exist for connecting modules made of similar or different materials into robots. Chemical glue or adhesives can be applied to the interface between two modules for bonding; however, the structures assembled by permanent adhesives cannot be readily disassembled without damaging the original units. Reversible adhesives have their own limitations and often require heating to sever the bond. Mechanical connectors such as bolts or knuckle joints in hard robotics are both sturdy and reversible, however, these connections require precise alignment for docking of the matching pieces, and thus necessitate the use of sophisticated system of sensor, feedback, and control for remote or automated assembly and disassembly.

SUMMARY

Reconfigurable soft robotic actuators with hard components, e.g., a 'hybrid' hard-soft robot are described. These and other aspects and embodiments of the disclosure are illustrated and described below.

Certain embodiments contemplate the use of magnetic components to align and/or couple pressurizable networks of channels or chambers embedded in elastomeric or extensible bodies (e.g., soft molded bodies). Other embodiments contemplate the use of magnetic coupling of soft molded bodies to other hard components (e.g., frames and connectors) to build complex structures. Magnetic coupling is accomplished by embedding magnets into the components to be coupled so that the opposite poles are exposed and are joined by magnetic attraction. The magnets could be permanent or electromagnetic; however, portability is furthered by the use of permanent magnets. The location, size and shape of the magnets are selected so that the coupling of parts provides self-alignment of the internal pneumatic channels. For example, a first magnet is located around an inlet to a pneumatic chamber in a first soft component and a second magnet of complementary shape is placed around a second inlet to a pneumatic chamber in second soft component. The location of the magnets is selected so that the first and second inlets align and form a compliant seal when the first and second magnets are in contact with one another. Similar designs can be used to join hard and soft components.

The soft and hard components may be reversibly coupled. In some embodiments, they can be decoupled by external forces, such as manual separation of the parts. In other embodiments, the magnetically coupled components may be remotely decoupled. For example, pneumatic de-coupling chambers are built into the hard component frames or connectors to de-couple the hard components from magnetically-coupled soft molded bodies. In the resting state, the de-coupling chambers are deflated and lie flush against a surface of the hard body that is disposed between the hard and soft components. To decouple the hard body from the soft body, the de-coupling chamber is inflated, causing it to distend and displace the soft component a distance from the hard component sufficient to overcome the magnetic attraction of the complementary magnets.

The use of magnetic self-alignment coupling and pneumatic de-coupling allows for the remote assembly and disassembly of complex structures involving hard and soft components. The magnetic coupling allows for rapid, reversible reconfiguration of hybrid soft-hard robots for repair, testing new designs, and carrying out new tasks. The features of remote actuation, assembly and disassembly are relevant for applications such as exploration of distant or dangerous environments and remote handling of hazardous chemicals or products.

BRIEF DESCRIPTION OF THE DRAWINGS

The invention is described with reference to the following figures, which are presented for the purpose of illustration only and are not intended to be limiting. In the Drawings:

FIGS. 2A-2J illustrate the design of a pneumatically actuated bladder integrated into a hard magnetic connector (inflatable connector) for disassembling or decoupling modules, according to one or more embodiments.

FIGS. 6A-6E illustrate the transformation of a hexapedal robot into a quadruped walker using pneumatic trigger, according to one or more embodiments. (A-E): front views of a soft-hard robot under locomotion. Insets at the top and the bottom right corners of each panel correspond to the top view and the schematic of the state of actuation of the various modules respectively. The actuated states of the front and back legs (white rectangular blocks) of the hexapedal robot during locomotion are omitted for clarity. Dark rectangular blocks with vertical stripes represent the states of actuation of the inflatable connectors while the adjacent gray rectangular blocks correspond to the soft legs in contact with the inflatable connectors. (A, B): pneumatic actuation of two soft legs connected to the inflatable connectors. (C, D): Inflating the bladders of the connectors severs the magnetic connections with the soft legs. (E): detaching two soft legs converts a hexpedal robot into a quadrupedal walker.

FIGS. 7A-7J illustrates a quadruped porter that loads, transports, and unloads cargos using pneumatic actuation, according to one or more embodiments. (A-J): the top perspective view of the robot. Insets at the top right corner of Panel B to J show the schematic representation of the state of actuation of various components of the robot. The dark circle at the center represents the central channel while each dark, small rectangle represents one of the four side channels of the soft tentacle. Rectangular blocks with vertical stripes represent the inflatable connectors and the gray outer blocks represent the hard containers. The actuated state of the front and the back legs (white rectangular blocks) of the robot during locomotion are omitted for clarity. (A, B): a pneumatically actuated quadrupedal porter moves towards and then pauses in front of its target (sphere). (C): pneumatically actuated soft tentacle positions its apex to connect with a soft gripper using magnetic connector. (D-G): the assembled tentacle-gripper picks up, and loads the target into the left container for transport. (H, I): actuation of the inflatable adaptors unloads the cargo-containers. (J): delivery of the cargos is completed.

FIGS. 8A-8F illustrate soft modules embedded with NdFeB ring magnets, according to one or more embodiments, including (A) a cross-sectional across M-N view of the magnetic interface of a soft leg embedded with an NdFeB ring magnet; (B) top view of a soft gripper embedded with an NdFeB magnet at the center; (C): a schematic of cross-sectional view of the magnetic interface of soft leg and soft gripper. (D): side view of a modified soft tentacle that has four side channels. Inset at the bottom right corner highlights four steel spheres embedded at the base of a modified tentacle. Inset at the top right corner shows the expanded view of the apex of the soft tentacle embedded with NdFeB ring magnet. (E, F): cross-sectional schematics of the base and the apex of the soft tentacle respectively.

FIGS. 9A-9O illustrate design and assembly of hard modules, according to one or more embodiments. (A-C): top, expanded, and side views of a hard hexagonal frame. (D-F): top, bottom, and side views of a hard magnetic connector. (D): dashed outline shows a thin membrane of Ecoflex 0030 covering an NdFeB ring magnet. An open channel through the center of side adaptor connects the top and bottom faces and serves as the air inlet for magnet-embedded soft actuator (not shown). (E, F): dashed outline shows portion of a hard magnetic connector that fits with the side socket of the hard hexagonal frame. (G-I): design and assembly of a hard central adaptor for soft tentacle. The central adaptor consists of two identical arches, each of which can house up to three magnets (G): top view of an assembled central adaptor. Dashed line highlights the socket that connects with soft tentacle. (H): perspective view of the pockets for housing NdFeB ball magnets in the central adaptor and of a lid-anchor for sealing the magnet. (I): the cross-sectional view of the hard central adaptor (i.e., the side view of an arch). (J-L): top, front, and side views of a hard container that has an NdFeB ring magnet embedded for interfacing with side adaptor. (M-O): top, top perspective, and bottom perspective views of a manually assembled hard body consisting of a central adaptor, a hexagonal frame, six magnetic connectors, and two containers.

FIGS. 16A-16D are schematics of the pneumatic network of soft tentacles according to various embodiments.

DETAILED DESCRIPTION

Figure 1A:
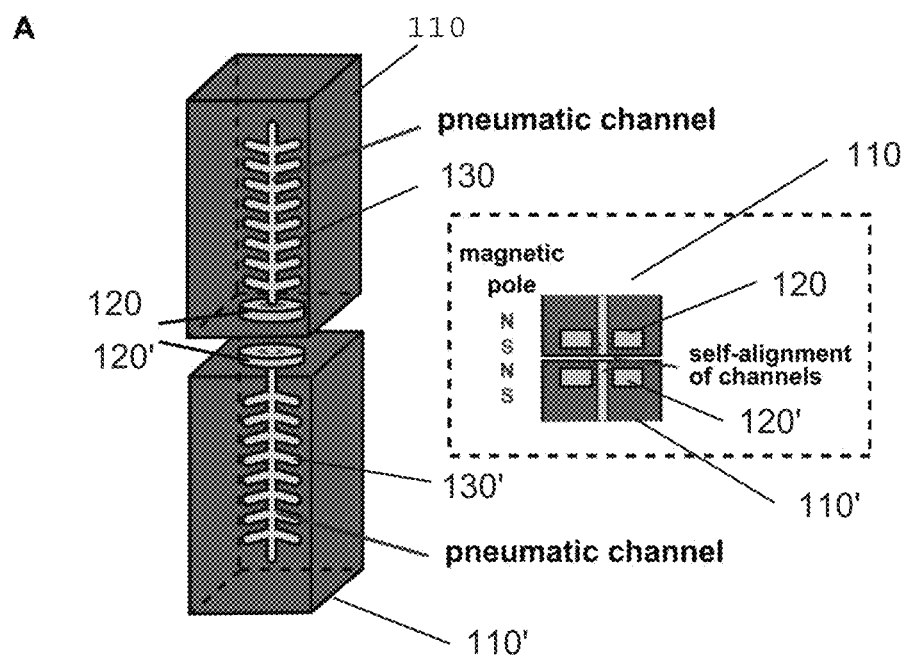
FIGS. 1A-1B illustrate schematic representations of two different magnetic configurations of modular assembly alignment or coupling, according to one or more embodiments.

Soft robots have a flexible molded body with embedded channels or networks of channels. A portion of the molded "soft" body is comprised of an elastically extensible material and a portion of the molded body is strain limiting relative to the elastically extensible material. The soft body robotic device includes a pressurizing inlet that is configured to receive fluid for the interconnected channels. The molded body in the soft body robotic device is configured to preferentially expand when interconnected channels are pressurized by the fluid, causing a bending motion around the strain-limiting portion of the molded body. Soft modules are typically actuated by pressurizing the hollow chamber of the molded body with air, which has negligible contribution to the overall mass of the robots and reduces the burden of mass to the robots during locomotion. These embedded channels can be pressurized to provide large and versatile actuation to soft elastomers. The details of these soft robotic actuators are disclosed in PCT Application No. US11/61720 and are incorporated herein by reference.

Although these soft robots (e.g., grippers, walkers, and tentacles) with planar or simple body plans can be rapidly fabricated from silicone elastomers using soft lithography, these robots are not easily reconfigurable. In addition, expanding the capability of soft robots for the fabrication of advanced robotic systems demands integration of composite materials (e.g., thermoplastics, metals) or implementation of complex three-dimensional pneumatic networks that are difficult to mold directly in a single step.

In one aspect, a reconfigurable robot includes a soft module that is reversibly attached to a hard frame (hard module) using a magnetic coupling (also referred to as a "magnetic interface"). Embedding magnets into the soft and hard modules provides simple-connector units made of similar or different materials; moreover, magnetic connections are strong, yet reversible, and this reversibility allows rapid reconfiguration of robots for carrying out different tasks and testing new designs. In addition, magnetic interfaces are self-aligning, thereby relieving the need for precise three-dimensional control for assembling two complementary units. The hard frame provides mechanical strength or rigidity to the hybrid hard-soft robot, can secure the soft modules in desired orientations and/or can provide a base for mounting other modules with additional functionalities such as sensors, power sources and the like. Soft legs can be attached to hard magnetic connectors and the magnetic attraction between the soft legs and hard modules maintain the structural integrity of assembled system.

Modular assembly and disassembly of complex robotic structure uses magnetic coupling. Magnetic connectors can be used to assemble soft and hard components into reconfigurable robots capable of walking, surveying, manipulating objects, and transporting cargos. The process includes (i) fabricating soft modules by soft lithography and fabricating the hard modules (e.g., frames or adaptors) for example using a 3D printer; (ii) embedding magnetic couplers into the hard and soft components; and (iii) assembling the units into reconfigurable robots.

Magnetic Coupling or Assembly

In one embodiment, ring magnets are embedded near the inlet portion of the flexible molded body of a soft component. The inlet connect the interior inflatable chamber with an external pressurizing gas source to allow for activation of the module. Embedded ring magnets in the modules allow the hollow center of a ring magnet to self-align with that of another ring magnet (from another module) of commensurate inner and outer diameters. The embedded magnets are used to magnetically couple the soft components to hard components, which also contain magnetic coupling material. When a ring magnet is encased in a soft flexible material, it pinches and deforms the thin wall of the elastomer against another module (when it is magnetically coupled to another module) to form a compliant seal around the hollow centers of the magnets at their interface. For example, when magnetic rings of opposite polarity are placed around the inlet of two soft modules, the magnetic coupling aligns the inlets, and subsequently couples the chambers of the two modules, to allow for coupled pressurization and actuation of the two components. Open channels passing through the axially aligned ring magnets then form a continuous conduit for transporting fluid (e.g., air) between the modules and these fluids can be used for actuation, sampling, and delivery of chemicals. In other embodiments, a soft and a hard component may also be coupled. The hard component may simply act as a physical connector or it may also couple the soft component to the fluid of other chambered networks. If the hard component also contains a channel, the channels of the soft and hard components may be coupled in a similar way to that of two soft components.

FIG. 1A illustrates modular assembly of two sort modules 110, 100' using ring magnets, e.g., NdFeB magnets. Module 110, 100' contain a ring magnets 120, 120', respectively, of opposite magnetic poles in facing relationship. The magnets are embedded within the soft module and have a thin elastomeric layer covering the magnet. The magnetic attraction brings the two soft modules together and presses the elastomeric material from each together to form an air-tight seal. Self-alignment of the hollow centers of the ring magnets forms a continuous conduit between pneumatic channels 130, 130' of the two modules. The inset shows an expanded cross-sectional view of the interface of the two modules, illustrating the magnet polarity and self-alignment of the pneumatic channels.

Ring magnets can also be used in the modular assembly of a soft module with a hard component. In this embodiment, the hard component also includes a ring magnet. The magnetic attraction brings the soft module and the hard module together and presses the elastomeric material from the soft module against the hard module to form an air-tight seal. Self-alignment of the hollow centers of the ring magnets can be used to form a continuous conduit between pneumatic channels in the soft and hard modules. It is not necessary for the ring magnet of the hard component to be covered by elastomer, as the elastomer of the soft component is sufficient to form a compliant seal. FIGS. 2D and 2E (discussed in greater detail below), exemplify a modular assembly of a soft module and a hard module using a ring magnets.

Figure 1B:
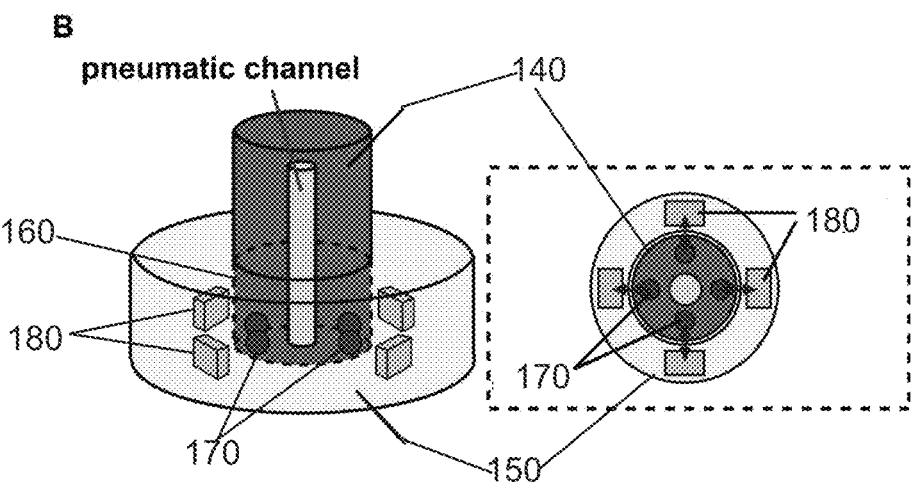

FIG. 1B shows an alternative magnetic configuration for connecting soft module 140 and hard module 150. The hard module includes a cavity 160 that is sized to accommodate the end of the soft module. Steel spheres 170 (or other ferromagnetic material) embedded in the soft module are attracted by and pulled towards to an array of magnets 180 (of arbitrary shape) encased in the surrounding hard module. The inset shows a cross-sectional view of the magnetic interface, illustrating the sealing accommodation of the soft module in the cavity of the hard module and the attractive forces between the magnets and steel balls.

In some embodiments, the magnets are permanent magnets, although electromagnets can be used if the appropriate electric circuitry is provided. In some embodiments, permanent rare-earth NdFeB magnets were used as coupling magnets because they have the highest magnetic strength per unit mass among all permanent magnets that are commercially available. Using NdFeB magnets maximizes the strength of connection while minimizing the mass of the assembled device. Electromagnets are also contemplated, although they require a supply of electrical current and additional circuitry to maintain or alter the connectivity of an assembly. Pairing permanent magnets of other shapes with weakly ferromagnetic materials (e.g., steel) can be exploited for joining modules when stable bonding is needed but self-alignment is not required. In addition, embedding multiple weakly ferromagnetic objects into a soft pneu-net module simplifies the fabrication because there is no net attractive or repulsive magnetic interaction between magnets when they are confined within a small volume of elastomer. Magnetic interactions present in modules with multiple magnets also present special challenges for fixing these strongly interacting magnets in soft materials during the curing process of the polymer.

In addition, while a ring magnet is described, it is understood that the magnetic can be of an arbitrary shape. As detailed above, ring magnets are self-aligning. The magnet is desirably able to surround or substantially surround the pneumatic channel to an extent that it allows the complementary module to be magnetically secured and aligned with the pneumatic channel. This property was used to guide and form networks of continuous, well-sealed channels between modules for the pneumatic actuation of soft robots (e.g., legs, grippers, and tentacles). The self-alignment of ring magnets relieves the precision required for connecting modules. As a result, an operator can easily control and assemble the robot or the components of the robot from a distance with pneumatic controls (i.e., teleoperation).

Remote Disassembly

In some embodiments, an integrated a pneumatic trigger for remote disassembly of modular soft robots can be used. This capability provides a teleoperator additional flexibility in tailoring the functions of assembled robots or machineries in response to unforeseen demands in real time.

A pneumatically actuated "bladder" can be integrated into a hard magnetic connector for disassembling modules. The bladder is sandwiched between the two components and uses pressurized gas for actuation. In one or more embodiments, the hard module can house a flexible bladder that is capable of expansion independently from the soft module actuation. In assembly, magnetic attraction brings the soft module and the hard module together and presses the elastomeric material from the both modules together to form an air-tight seal. The flexible bladder also can be configured to provide a pneumatic channel in the hard module so that the two modules can be pneumatically connected. When the flexible bladder of the hard module is expanded, it pushes against the soft module and forces it away from the hard component, thereby weakening the magnetic forces holding the modules together and decoupling them.

As shown in FIGS. 2A-2J, a "bladder" sandwiched between two components was inflated and thereby increased the distance between coupling magnets, weakening the magnetic force between the modules. This design was implemented by integrating a pneumatically actuated bladder into a hard magnetic connector (for simplicity, it is called an inflatable connector). When the inflatable connector is fully actuated, the magnets separate and other mechanical forces (e.g., gravity, friction) exerted on each module overcome the weakened magnetic attraction and disconnect the two adjoining units.

FIGS. 2A-2B are photographs showing top and side views of a non-actuated inflatable connector 200. FIG. 2C shows a cross-sectional schematic of a non-actuated inflatable connector. The side 225 and central 230 channels are highlighted with dashed outlines. The inflatable connector includes a rigid housing 210 that holds a flexible bladder 220. The flexible bladder includes a side channel 225 that is connectable to a source of pressurized gas through an inlet in the rigid housing. The bladder 220 can optionally have a central channel 230 that aligns with a central channel 215 in rigid housing 210. Magnet 240 is positioned around the optional central channel 230 along a face that is accessible to the soft module.

FIG. 2D is a photograph showing a side view of a vertically suspended assembly consisting of a soft leg (soft module) 250 having embedded magnets 255 and inlet 260. FIG. 2E shows a cross-sectional schematic of FIG. 2D. The strong magnetic attraction between magnets 230 and 245 (shown by arrows in FIG. 2E) hold the robot assembly together.

To disassemble the robot, the flexible bladder is inflated through inlet 270 into channel 225, forming an expanded chamber 280 and expanding towards the soft module. FIG. 2F shows pneumatic actuation of elastomeric bladder increases the gap between the soft leg and the connector and FIG. 2G shows a cross-sectional schematic of FIG. 2F. FIGS. 2H-2I show top perspective and side views of a fully actuated inflatable connector, which pushes away and disconnects from the soft leg (not shown). FIG. 2J shows a cross-sectional schematic of a fully actuated inflatable connector.

The reverse process—disassembly of modules—can be accomplished using a pneumatic trigger by the teleoperator. The ability to assemble and disassemble robotic or mechanical modules remotely through a combination of pneumatic actuators and self-aligning magnetic connectors has not previously been demonstrated.

Alternative mechanisms using electromagnets allow the separation of two modules held together by magnetic force. This mechanism would require additional wirings and circuits, and a supply of electricity to maintain or alter the connectivity of the assembly. Past methods for remote and reversible connection utilized either electrical power or a sophisticated system of sensors and controls.

Design and Fabrications of Soft Legs, Grippers, and Tentacles

As shown in FIGS. 8A-8C, a NdFeB ring magnet can inserted into a designated section of a soft module, and the magnet can be sealed against a thin membrane (~0.7 mm) of silicone elastomer. FIG. 8C is a cross-sectional schematic of a six-armed 800 soft gripper, as viewed from the side. The gripper consisted of an extensible layer of Ecoflex® 0030, and a strain-limiting layer of PDMS. All the side channels 810 were connected at the center of the gripper through the central channel 830, which was linked to an air inlet 820 on top. An axially-magnetized NdFeB ring magnet 840 was embedded at the top of the gripper. The central channel passed through the center of the embedded ring magnet. FIG. 8A is a cross-sectional schematic of the soft gripper, as viewed from the top with height defined by the line M-N. (c) FIG. 8B is a cross-sectional schematic of the soft gripper as viewed from the bottom with height defined by the line O-P.

Figure 8D:
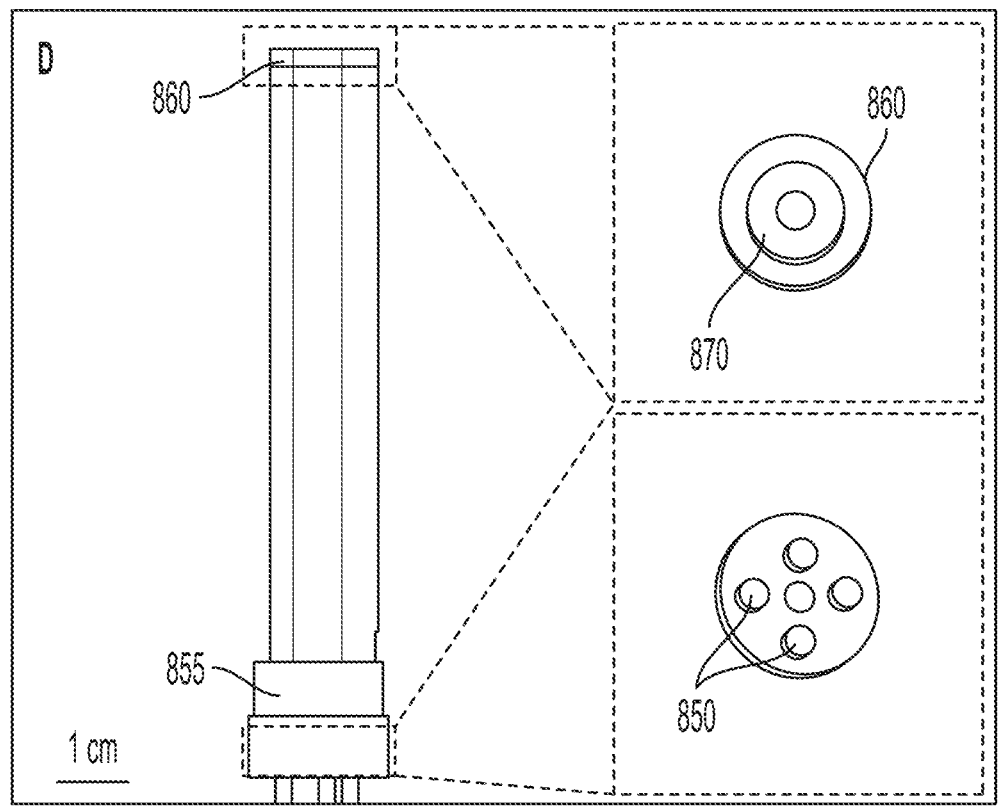
Figures 8E, 8F:
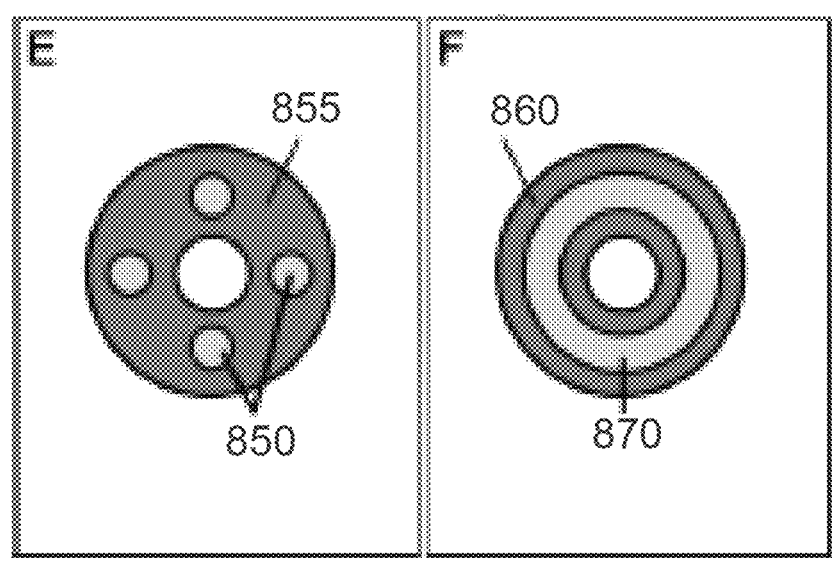

In another embodiment, four steel balls 850 can be embedded into the enlarged base of a soft tentacle 855, as shown in FIGS. 8D and 8E. The use of steel simplifies the process of embedding magnetizable material in a small confined volume and a weaker magnetic attraction between the tentacle and the adaptor prevents damages (e.g., tearing) to the soft module during their disassembly. The tentacle can be designed with four side-channels, such that these side channels are equally distant from the center of the tentacle and are 90 degree apart. The incorporation of four side-channels provides flexibility in manipulating add-on components inserted in or interfaced with the tentacle.

Other capabilities can be included in the soft module. For example. a miniaturized video camera can be installed at the apical end 860 of the central channel of soft tentacle, and the combined camera—soft tentacle can be used as a flexible optical sensor. Alternatively, the soft tentacle can be re-purposed for interfacing with a soft gripper by embedding an NdFeB ring 870 magnet at its apex and by inserting a flexible tubing through the hollow center of the ring magnet and the central channel of the tentacle (FIGS. 8D, 8F).

Elastomeric or flexible polymers can be used to prepare the soft acuatable modules. Exemplary elastomers include silicone elastomers; exemplary silicone elastomers for the extensible (stretchy) layer include Ecoflex® 0030, Ecoflex® 0050, Elastosil® M4601 and Dragon Skin® 30; exemplary silicone elastomers for the strain-limiting (stiffer) layer include T PDMS Sylgard® 184 and Elastosil® M4601 paper Composite. To enable actuation of soft legs (each leg weighs 6.5 g) under heavy load (>nine times the weight of each individual leg), the extensible layer for soft modules is desirably made of an elastomer of relatively high Young's modulus. Silicone rubber made from blending Ecoflex 0050 (70%) with Dragon Skin 30 (30%) provides soft legs with both the stiffness against the compression-force exerted by the combined weight of all components and the elasticity for pneumatic actuation. For the soft gripper, elastomer (Ecoflex 0030) of lower Young's modulus can be used for the function of the extensible layer. After curing of the extensible layer, the magnet-embedded elastomer was sealed against a strain-limiting sheet made of poly(dimethylsiloxane) (PDMS) (Dow Corning, Sylgard® 184). To prevent the collapse of the tentacle under its own weight and to provide the needed flexibility and lift-force to pick up an object during the manipulation of a gripper, stiffer blend of elastomer such as Ecoflex 0050 (40%) and Dragon Skin 30 (60%) can be used for fabricating the soft tentacle. The details of these soft robotic actuators are discussed in the examples and in PCT Application No. US11/61720 which is incorporated herein by reference.

Soft-Soft Assembly

Figure 3A:
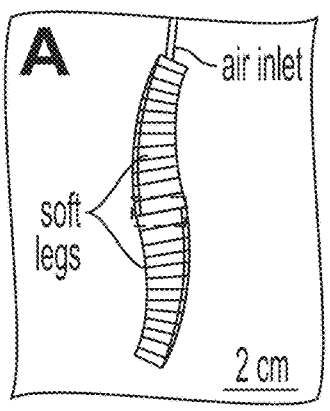
FIGS. 3A-3H illustrate the assembly and use of soft modules using ring magnets, according to one or more embodiments (dashed boxes in 3A and 3E highlight the magnetic interfaces) including (A) a vertically suspended assembly of two soft legs, each embedded with identical but oppositely oriented neodymium-iron-boron (NdFeB) ring magnet; (B-D) pneumatic actuation of an assembly of two soft legs in which strain-limiting layers locate on the opposite face of a vertically (B) and a horizontally (C) suspended assembly, and in which (D) strain-limiting layers on the same face of an assembly suspended horizontally; (E) a vertically suspended assembly consisting of a soft tentacle and a soft gripper; and (F-H): pneumatic actuation of the gripper via the central channel of the tentacle to pick up a sphere.
Figure 3E:
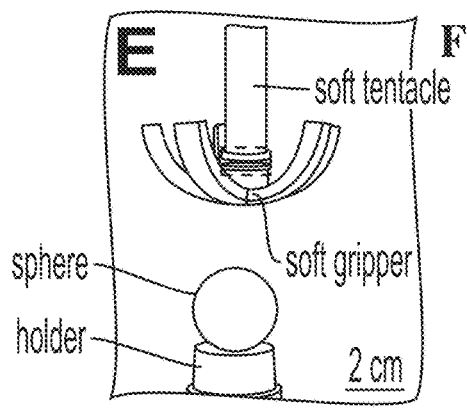
Figure 3B:
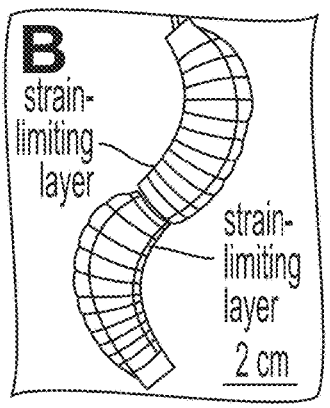
Figure 3F:
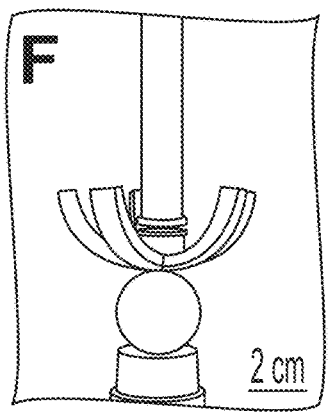
Figure 3C:
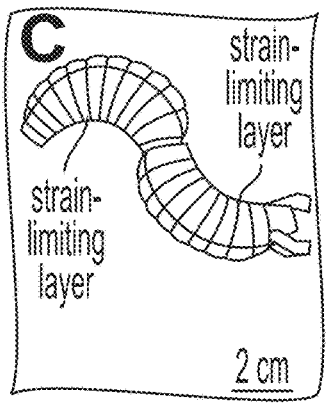
Figure 3G:
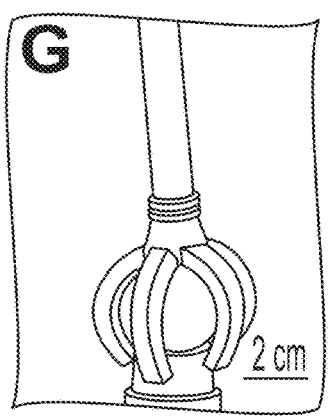
Figure 3D:
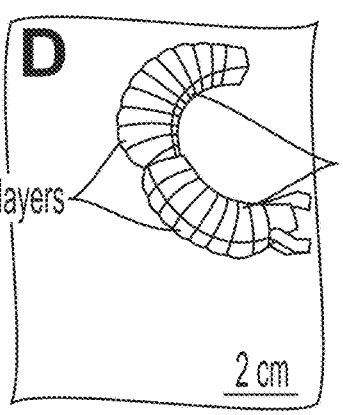

In one embodiment, actuation of an assembled soft machine consisting of two soft modules was achieved. As shown in FIG. 3A, two ring magnet-embedded soft legs were connected and poly(ethylene) tubing was inserted as an air inlet to one of the soft legs. Pressurizing the internal pneumatic channels of soft legs with air led to inflation and bending of the entire assembly suspended either vertically or horizontally (as shown in FIGS. 3B-3D). These results demonstrated that the embedded NdFeB magnets forged a stable connection between two soft legs (~3 N pull force) and self-aligned the open networks at the hollow centers of the rings to form a well-sealed, continuous channel that supports pneumatic actuation of the assembly.

Figure 3H:
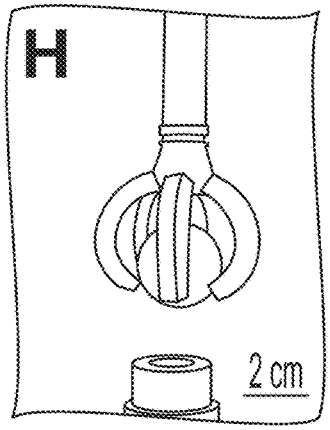

Assembly and actuation of soft modules that have complex three-dimensional pneumatic networks was also achieved. Modular assembly was applied to connect a soft tentacle and a soft gripper using magnets to illustrate the utility of a magnetic connector in prototyping soft robots that have complicated three-dimensional internal pneumatic channels (FIG. 3E). Pneumatic actuation through the central channel of the tentacle enabled the vertically suspended tentacle-gripper to pick up a sphere (weight, 9.5 g) and hold it in the air (FIGS. 3F-3H). The four side channel actuation mechanism of the soft tentacle provided the soft gripper additional degrees of freedom for manipulating objects in three-dimensional space (vide infra). Molding a soft tentacle-gripper machine in a single step would be difficult due to the complex architecture of the internal pneumatic networks.

Designs and Fabrications of Hard Manifold, Magnetic Connectors, and Magnetic Containers In one or more embodiments, the hard magnetic connector can be secured in a main scaffold. The scaffold can secure a number of hard magnetic connectors, each connector for example, capable of assembly with a soft module. In this manner, a hybrid hard-soft robot having multiple soft components can be obtained. The individual hard magnetic connectors (and their associated soft module) can be capable of coordinated or integrated actuation. In one or more embodiments, the main scaffold can rigidly hold the hard magnetic connectors in a fixed relationship with respect to one another.

A hard hexagonal frame 900 (FIG. 9A) can be fabricated as a main scaffold and central body of a modular robot. This frame had six side sockets 910 (FIG. 9B) and one hollow center 920; these cavities were designed to fit tightly and mechanically with seven hard magnetic connectors (one for the center and the other six for the side sockets) of matching shapes and dimensions (FIGS. 9A-9C). A quadrilateral frame with magnet-embedded connectors on each side can be used for assembling a quadruped walker. The two additional side magnetic connectors mounted on the hexagonal manifold provide further opportunities for introducing different modules (e.g., container) for other functions (e.g., storage).

To connect hard modules to magnet-embedded soft actuators, NdFeB magnets 930 were inserted into the hard adaptors 940. These modules included hard side magnetic connectors for interfacing with soft leg, a hard central magnetic connector for anchoring soft tentacle, and hard containers for storage and transport of cargos. The side magnetic connector had an open channel 950 at the hollow center of the embedded ring magnet to serve an air inlet for pneumatic actuation of soft actuator (FIGS. 9D-9F). A hard hexagonal frame 900 with built-in side magnetic connectors is also contemplated. Central magnetic connectors 960 for the soft tentacle housed a radial array of NdFeB ball magnets 970 in pocket 975 for attracting the steel spheres embedded in the tentacle and for holding the tentacle in place (FIGS. 9G-9I). To facilitate the transport of centimeter-sized objects by multi-legged robots, hard-storage containers 980 were fabricated with magnetic interfaces 985 that can reversibly attach to and detach from the side connectors (FIGS. 9J-9L). A manually assembled hard body, comprising a hexagonal frame 900, six side adaptors 940, a central adaptor 960, and two containers 980, is shown in FIGS. 9M-9O.

The advantages of some exemplary systems assembled from hard and soft components include: (i) Multi-legged robots assembled using soft legs and a hard frame with magnetic connectors were able to walk on rigid, non-slippery surfaces. The soft legs were able to be replaced for repair or exchanged with legs of different size, material, or shape; (ii) modification of quadruped walkers with a series of functionally distinct soft tentacles enabled these robots to conduct optical surveillance, or manipulate centimeter-sized objects when combined with an add-on soft-gripper module; and (iii) the remote triggering of the detachment of two modules with an integrated pneumatic bubble allowed for remote re-configuration, and loading and unloading cargos from the robot.

Hard materials were utilized for the central body of a soft quadruped walker for two reasons: First, a rigid hard manifold with wedge-shaped adaptors is shown to interface with soft actuators (e.g., legs) at a fixed inclined angle. Thus, the rigidity of the hard body of a soft-hard walker maintained a minimal angle of contact between the soft legs and the ground for locomotion, and provided a substitute to continuous pneumatic actuation that would be required for maintaining the curvature of the central body of a fully-soft walker. Second, the center of a rigid manifold can be made hollow, and the void reduces the weight of the robot and provides additional space for mounting other modules (e.g., sensors, power sources, tentacles, and grippers).

The entire hard body of a soft-hard robot can be fabricated as a monolith. Alternatively, the hard bodies of these robots are assembled manually from individual components with mechanical or magnetic connectors. Adopting this alternative strategy of prototyping the hard body accelerates testing of various designs and enables rapid replacement of damaged components with new parts. Furthermore, unessential components for a particular task can be removed to reduce the mass of robots.

Soft-Hard Assembly

Magnetic connectors were used to build—in addition to robots assembled from soft modules exclusively—hybrid soft-hard robots consisting of a hard hexagonal frame, and six hard magnetic connectors, and soft legs. The six hard magnetic connectors were mechanically locked into the sockets of the hexagonal frame. The soft legs were then manually attached to the hard magnetic connectors, and the magnetic attraction between the soft and the hard modules was utilized to maintain the structural integrity of the assembly.

Figure 4A:
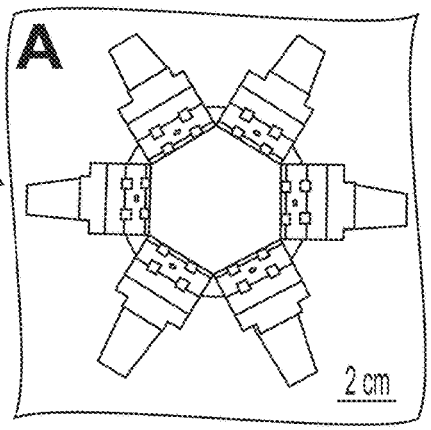
FIGS. 4A-4L illustrate re-configuration and locomotion of soft-hard robots, according to one or more embodiments including (A, B) top views of a robot with six legs and five legs respectively; (C, D) top views of a quadruped with different distribution of soft legs around the hexagonal body; (E, F) top views of a quadruped assembled from legs with different size, or legs made of different materials (soft legs with hard shoes made of acrylonitrile-butadiene-styrene (ABS) thermoplastics) respectively; (G) side view of a quadruped assembled from four soft legs of shape (tapered toes) different from that in Panel D; and (H-L) Locomotion of a tethered soft-hard quadruped of panel D (from left to right) on a flat, rigid, non-slippery surface (time (t) is indicated at the bottom left of each figure).
Figure 4B:
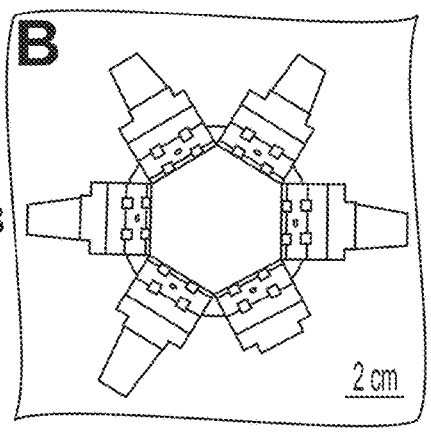
Figure 4C:
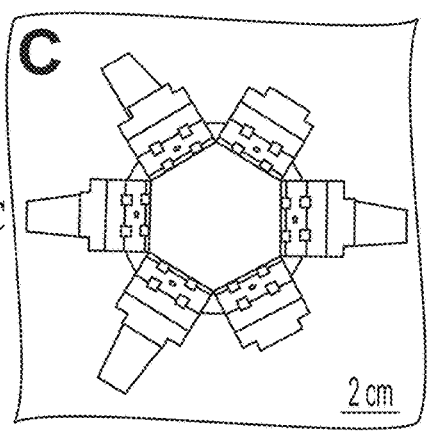
Figure 4D:
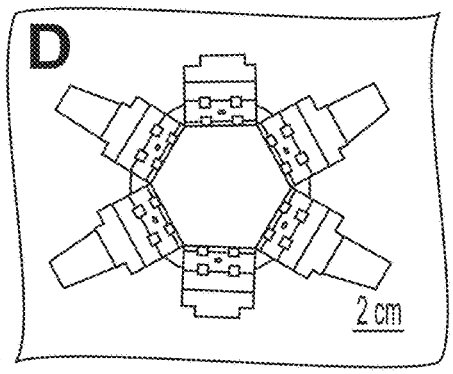
Figure 4E:
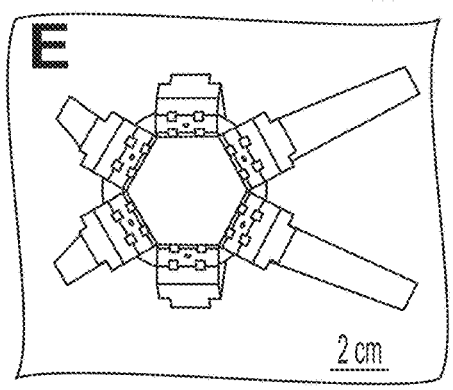
Figure 4F:
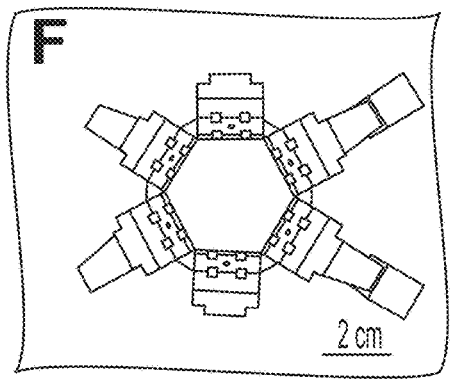
Figure 4G:
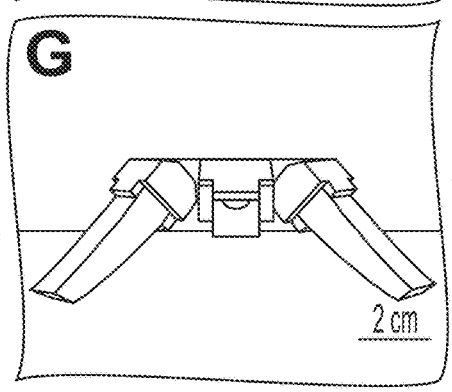
Figure 4H:
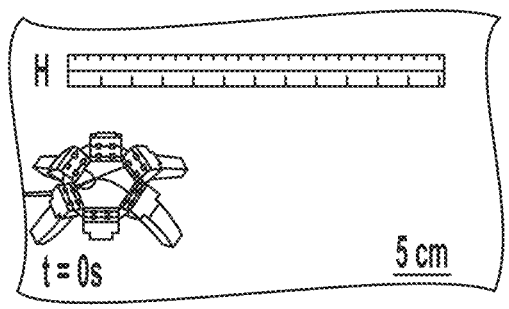
Figure 4I:
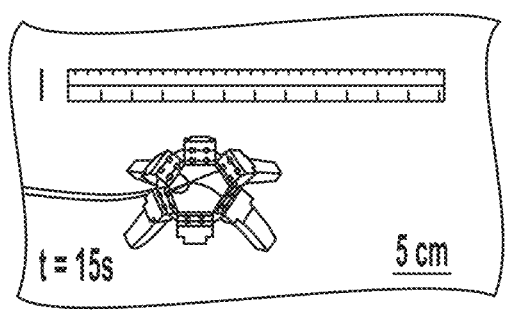
Figure 4J:
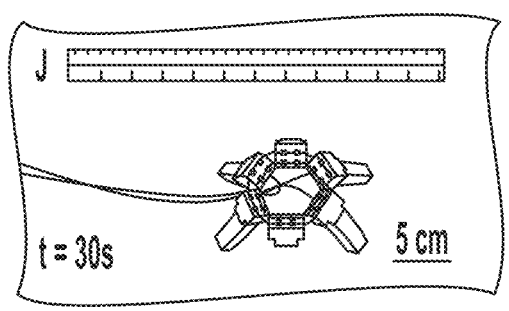
Figure 4K:
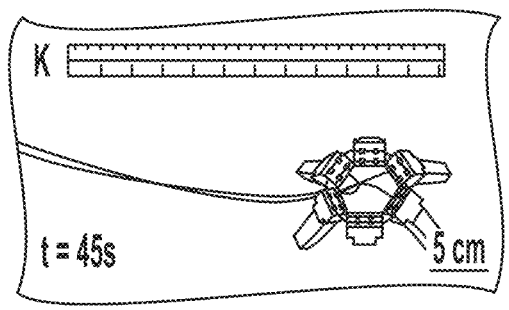
Figure 4L:
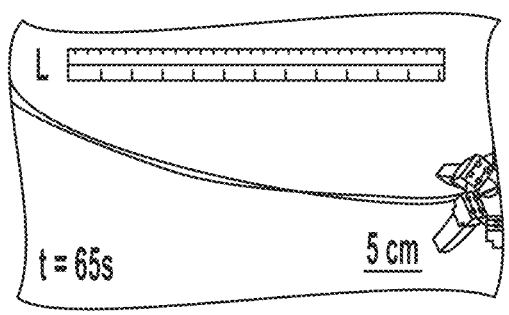

The reversibility of the magnetic connection allowed the robot to be rapidly reconfigured. This versatility allowed an operator to vary the number (FIGS. 4A-4B) and the distribution of soft legs around the hexagonal frame (FIGS. 4C-4D), exchange and combine legs of different size (FIG. 4E), material (FIG. 4F), or shape (FIG. 4G), or replace damaged legs quickly. Legs made of silicone-paper composite or modified to have different tread pads, e.g., spikes, all demonstrated an ability to locomote.

The stability of the magnetic connection enabled locomotion of a soft-hard quadruped. A hybrid, soft-hard quadruped—a robot with four soft legs and a hard body (weighing 63 g, excluding the tethers)—was operated using a computer-controlled compressed air source. Sequential pneumatic actuation of the legs (400 ms actuation at ~50-70 kPa for each leg in every cycle) directed the robot to walk on a flat, rigid, non-slippery surface for a distance of 0.3 m at a speed of ~17 m/h (FIGS. 4H-4L). The ability of the assembled robot to walk showed that the stability of these magnetic connections supported the structural demands associated with locomotion.

Multi-Functional Robot Constructed Via Modular Assembly

One major advantage of modular assembly is the ability to incorporate and integrate additional modules to provide new capability to the robot. For instance, modular soft-hard robot consisting of an optical sensor and soft legs for walking can provide visual feedback of its surrounding environment to the teleoperator, and this information will enable its controller to navigate the robot around obstacles and to monitor the immediate environment.

Figures 5A, 5B, 5C, 5D, 5E, 5F, 5G, 5H, 5I, 5J:
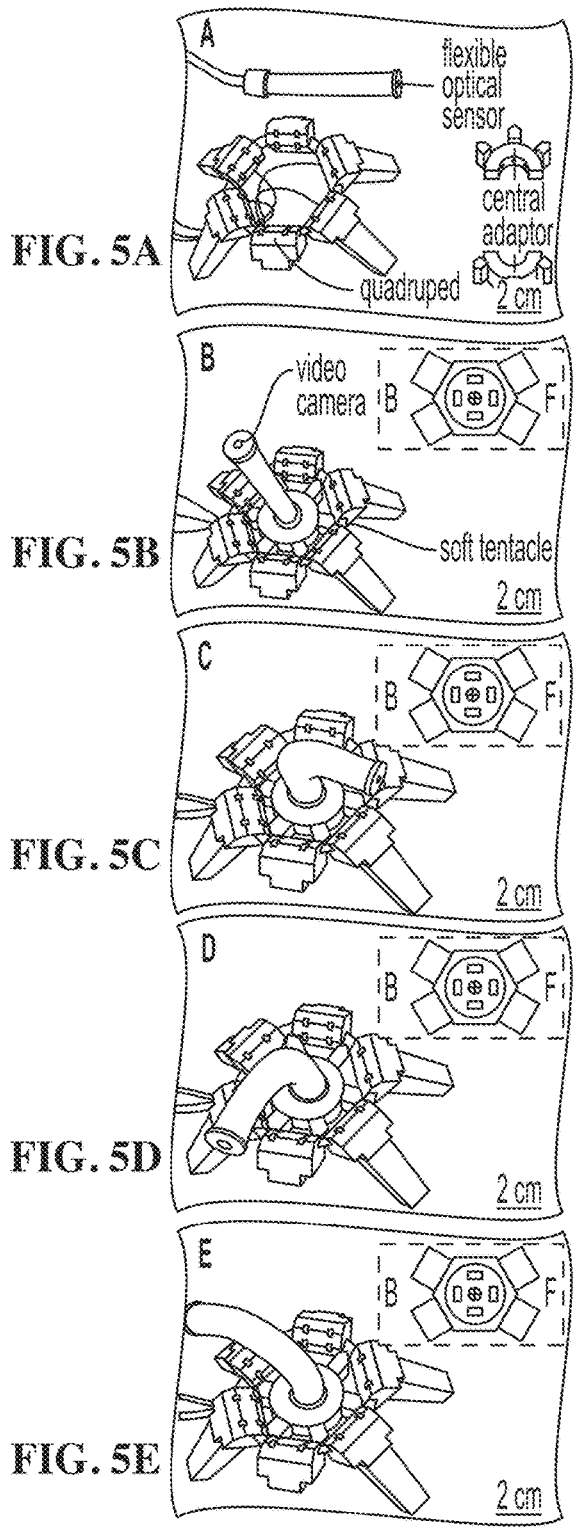
FIGS. 5A-5J illustrate a quadruped walker equipped with a flexible optical sensor to survey the surrounding environment, according to one or more embodiments. Each inset at the top right corner of Panel B to G shows the schematic representation of the state of actuation of the side channels of soft tentacle. Each rectangle represents a side channel. (A): modules of a mobile surveyor. (B): an assembled mobile surveyor. (C-G): pneumatic actuation of the side channels of soft tentacle enable positioning of the video camera over a wide range of angles in three-dimensional space. (H-I): the surveyor moves towards a white Styrofoam® cup. (J): actuation of the soft tentacle positions the video camera to view the interior of the cup. Bottom left inset of Panel J shows a hidden message, "GMW Gp", inside the cup as viewed from the video camera.

To assemble a quadruped mobile surveyor such as the robot described above, a small video camera was inserted at the apex of a soft tentacle and the base of this flexible optical sensor was anchored to a hard body of a soft-hard quadruped using magnetic connections (FIG. 5A). The soft tentacle had four side channels, each of which could be actuated individually (FIGS. 5B-5E) or two of which simultaneously (FIG. 5F) for positioning the inserted video camera over a wide range of angles.

Under computer-controlled pneumatic actuation, the assembled surveyor was moved towards a targeted location—a Styrofoam® cup. Then, the pneumatic actuation of the side channels of soft tentacles was manually controlled to position the video camera at a tilted angle, and through a window on the surface of the container, the video camera captured the image of a hidden message, "GMW Gp," inside the cup (FIGS. 5H-5J).

Remote Modifications of Robot and Machine

Manually reconfigurable robots are limited to perform tasks pre-determined by the connectivity and functions of the assembled modules. Remote modification of robots allows an operator to adjust the functions of robots according to the situation on ground.

The structure of a hexapedal soft-hard walker robot can be remotely altered. For example, a robot can be initially and manually assembled from a hard body and six soft legs. The hard body can consist of a hexagonal frame, four hard magnetic connectors, and two inflatable connectors. These six connectors can be mechanically coupled with the sockets of the hexagonal frame. Two of these legs can be connected to inflatable connectors ("bladders"), which can be actuated pneumatically and independently. The central channels of the four hard connectors and the two inflatable connectors can serve as the air inlets for pneumatic actuation of soft legs connected via magnetic interface.

A hexapedal, soft-hard robot as described above was tethered to a source of compressed air. The soft legs connected to the inflatable connectors were actuated pneumatically via the central channel on each adaptor (FIGS. 6A, 6B). Coordinated actuation of all six legs directed the hexapedal robot to walk on a flat, rigid, non-slippery surface. When pressurized with compressed air, an inflated bladder increased the distance between the leg and the connector, and the torque exerted by the weight of the soft leg eventually overcame the weakened force of attraction between the magnet-embedded modules (FIGS. 6C, 6D). The pneumatically-triggered disassembly of soft legs transformed a hexapedal robot into a quadrupedal walker without physical contact between the operator and the modules of the robot (FIG. 6E).

Quadrupedal Soft-Hard Robot Used for Loading, Transporting and Unloading Cargo To demonstrate the feasibility of combining pneumatic actuators and magnetic connectors for remote assembly and disassembly of a robot, a soft-hard quadruped was equipped with two hard containers connected to two inflatable connectors via magnetic interface coupling (FIG. 7A). This robot had a left container carrying a magnet-embedded soft gripper and a right container holding two spheres for balancing the weight of the gripper. A modified soft tentacle with a ring magnet at the apex and a poly(ethylene) tube through the central channel was placed at the center of the robot for manipulation of objects.

The soft-hard robot was directed to walk towards its target (a green sphere) using computer-controlled, pneumatic actuation (FIG. 7B). Inflating the side channel (see inset of FIG. 7C) of the soft tentacle with air caused the soft tentacle to bend towards the container carrying the soft gripper. Attractive magnetic force between the gripper and the ring magnet at apex of the bent tentacle pulled the two soft units together at close range, and self-aligned the central, open pneumatic channel of the soft tentacle with that of the soft gripper.

To test the function of the remotely assembled soft tentacle-gripper in manipulating centimeter-sized objects, the tentacle was used to position the gripper above the target (FIG. 7D), the gripper was actuated to pick up the sphere (FIG. 7E), the gripper was re-positioned with the tentacle using pneumatic control (FIG. 7F), and the object was released into an empty container (FIG. 7G). Re-initiating the pneumatic actuation of the soft legs enabled the soft-hard walker to transport the cargos to a different location.

The magnetically attached containers were disconnected from the quadruped by inflating the integrated elastomeric bladders. After triggering the disassembly of the containers from the magnetic interfaces, the robot completed the delivery of its cargos (FIGS. 7H-7J).

Quantification of the Strength of Magnetic Connector

Figure 10:
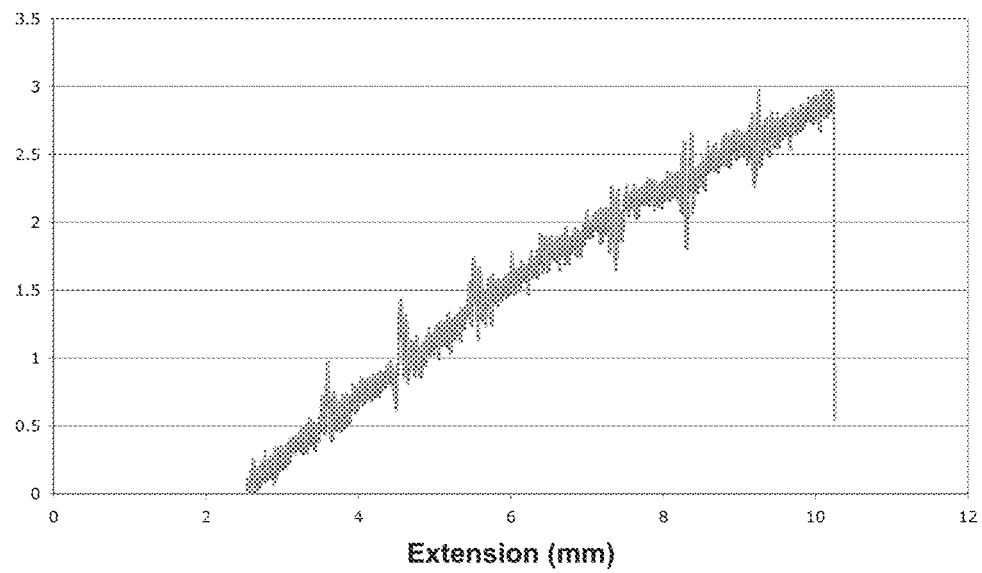
FIG. 10 illustrates a plot of the measurement of the minimum pull strength required for detaching two soft modules connected by ring magnets, according to one or more embodiments.
Figure 12:
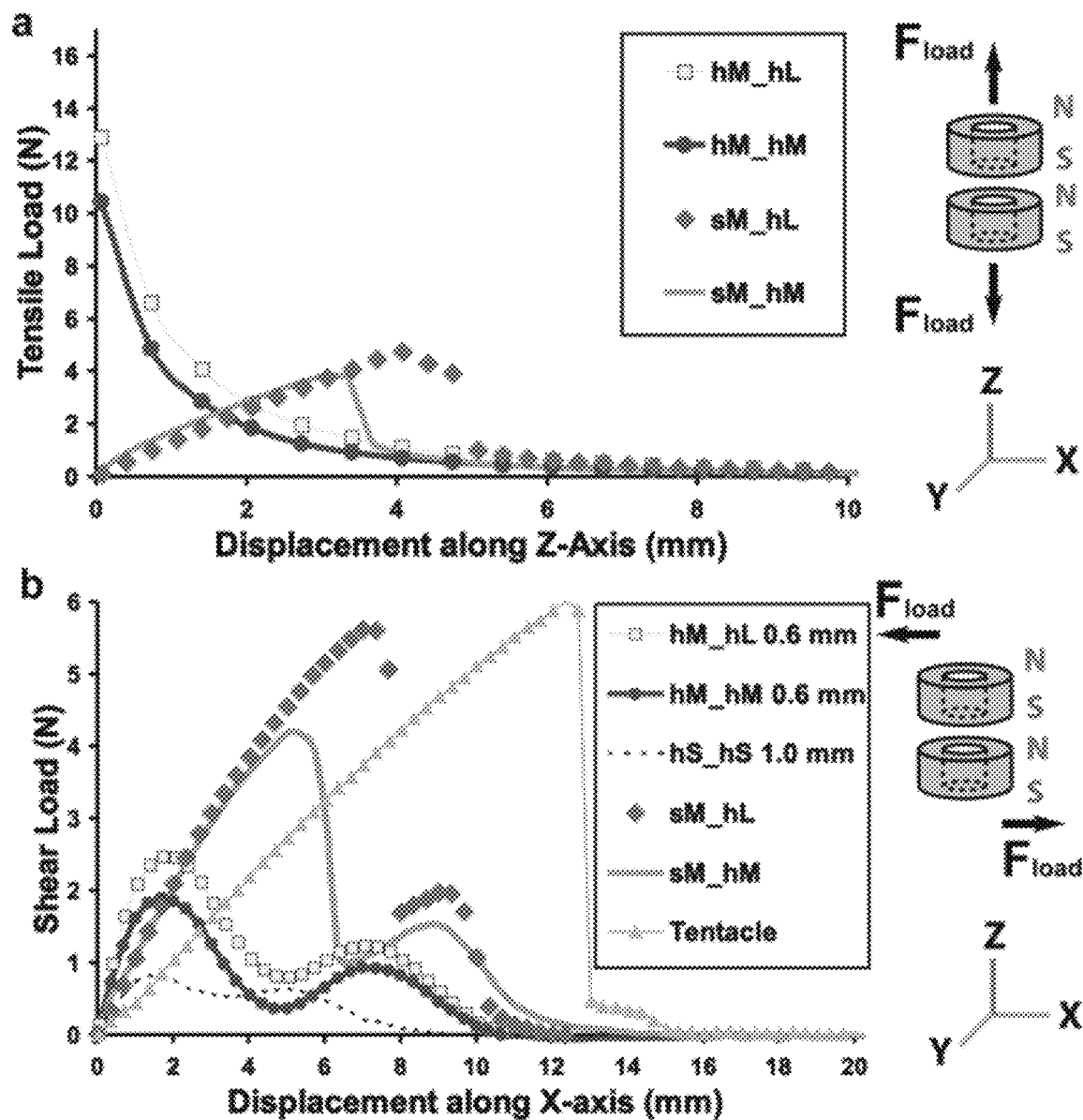
FIG. 12 shows the magnetic attraction force against (A) tensile and (B) shear load as a function of distance of separation between two NdFeB ring magnets. Legends show the various combinations of the magnetic pair used in each measurement. S, M, and L represent ring magnets of the following dimensions (O.D.×I.D.×thickness): ¼"×⅛"×0.1", ⅜"×⅛"×0.06", and ⅜"×⅛"×0.1" respectively. Prefixes h (hard) and s (soft) indicate the material of the module in which a ring magnet was embedded. Shown on the right of each panel is a simplified schematic of the relative displacement between two magnets under applied load. "Tentacle" represents the magnetic connection between a soft tentacle and a hard central connector and it contained four pairs of ring magnets (i.e., 4×sS_hS).

To quantify the tensile strength of the magnetic connection, a pull-force measurement was conducted on the assembled soft modules using tensile-force testing instrument Instron® model 5566. Disassembly of the two soft legs (weight, 6.6 g each) required an approximate 3.0 N of tensile force applied vertically and along the central longitudinal axis of the assembly (FIG. 10) held together by two identical NdFeB ring magnets (ID×OD×thickness: ⅛"×⅜"×¹⁄₁₆") of 6.7 N pull strength at the interface. Reduction of pull-force (by 55%) is likely a result of the spatial separation (combined thickness of sealing membrane ~1.5 to 2 mm) between the two magnets. The dimensions of the ring magnets and the elasticity of the materials in which they were embedded were varied, and the magnetic attraction force between these magnets was determined as a function of displacement parallel (tensile) or perpendicular (shear) to their axes of magnetization (z-axis). The tensile load supported by the magnetic connection between two hard modules (graphs of hM_hL and hM_hM, see inset of FIG. 12A) decayed rapidly with increasing separation (FIG. 12A). In contrast, the membrane, (thickness: 0.6-1.0 mm) required to seal the magnet inside of a soft actuator in a soft-hard connection, guaranteed that the two magnets involved in this connection would never be in direct contact, and thus increased the initial separation between the two magnets. As a result, the maximum tensile loads supported by the magnetic attraction forces within soft-hard connections (hM_sL and sM_hM) were similar to that of hard-hard connections separated by an air gap of similar distance (defined by the membrane, 0.6-1.0 mm)—approximately 60% lower than when the two magnets embedded in hard modules were in direct contact (0 mm) (FIG. 12A). The plots of tensile load versus displacement (FIG. 12A) in soft-hard connections also had different shape than the equivalent plots of hard-hard connections. In a soft-hard connection, the force initially increased gradually with displacement because the tensile force stretched the soft actuator while the two modules remained in contact. When the applied load exceeded the attractive force for keeping two modules together, the connection severed and the soft module recoiled to its original length. The sudden increase in gap between the magnets led to the rapid reduction of magnetic force that resisted the displacement of the hard module.

In addition to tensile load, shear load was also investigated. Similarly to what was observed in the tensile studies, the resistance against shear load decreased rapidly with increasing distance of separation (air gap) between two hard modules (FIG. 12B). With an air gap of 0.6 mm (or 1.0 mm), magnets embedded in hard modules, however, showed a 50-60% lower resistance to shear than the same magnetic pair separated by a silicone membrane, instead of air, of similar thickness (0.6-1.0 mm) in a soft-hard connection (FIG. 12B). The higher resistance of soft-hard connection against shear may be due to the friction between the magnet embedded in the hard module and the surface of the soft actuator.

Figure 11A:
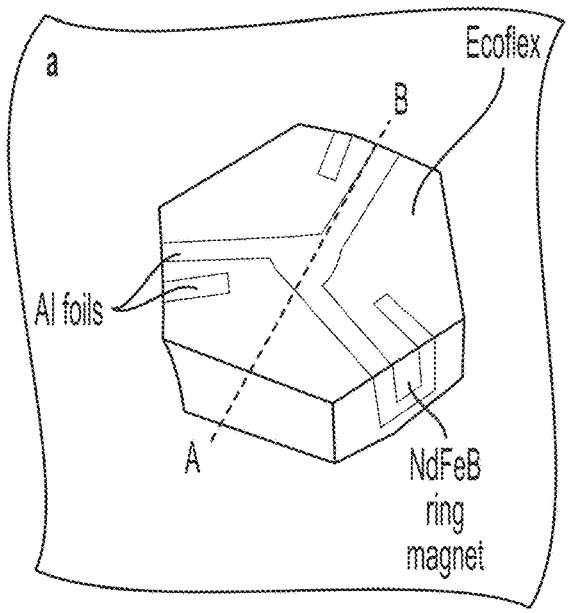
FIGS. 11A-11D illustrate an assembly of soft modules for conducting electricity via the magnetic interface, according to one or more embodiments, in which (A) a battery source (3×1.5 V) housed at the center of soft manifold is connected to the magnetic interface with thin strips of aluminum foil; (B) each soft leg has an LED embedded on one end and a ring magnet on the opposite end. The LED is connected to the exterior of magnetic interface of each leg using thin strips of aluminum foil; (C) top view of a fully assembled soft machine that powered up three LEDs (red, orange, and green) and (D) embedded LEDs remained powered up during the pneumatic actuation of two soft legs. Compressed air was supplied to the legs through one of the air inlets in the manifold.
Figure 11B:
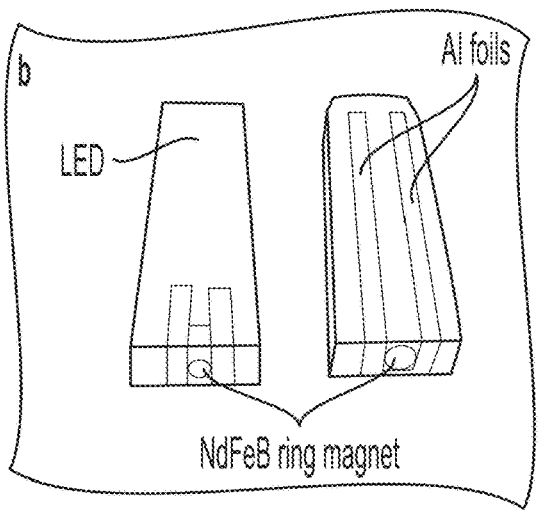
Figure 11C:
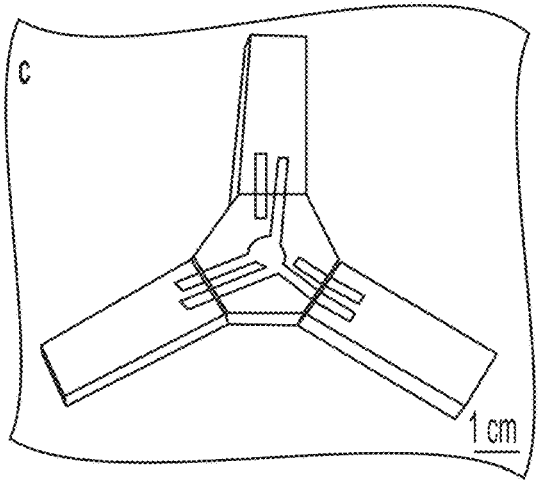
Figure 11D:
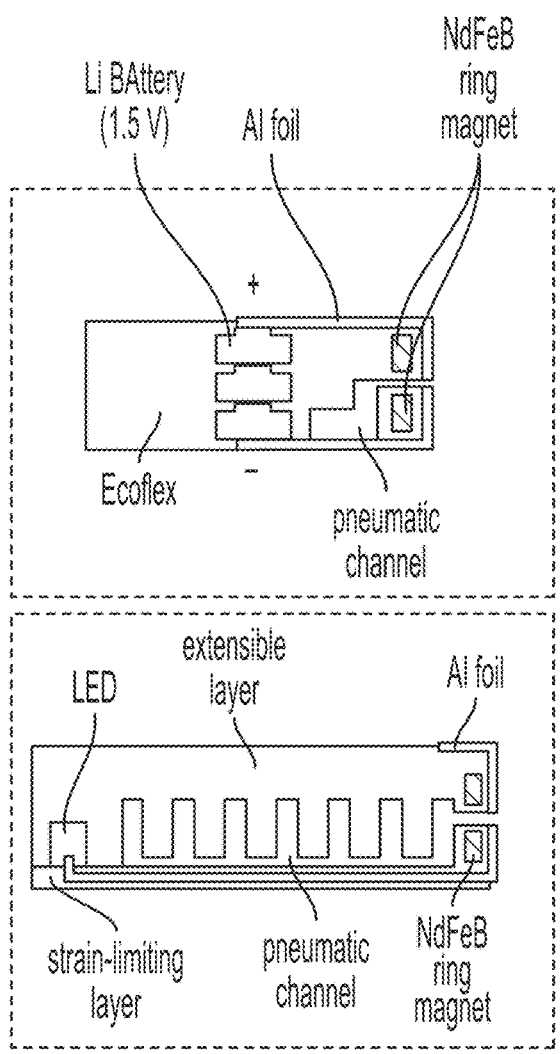

Magnetic Connection Supports Conduction of Electrical Current for Powering Up Electronics Embedded in Soft-Hard Assembly Coupling magnetic connections are not limited to supporting pneumatic actuation. For example, the physical contact at the interface between two modules can be exploited for conducting electrical current from one module to another. To test whether or not the magnetic interface can conduct electricity between modules for powering small electronics, a light emitting diodes (LED) were inserted at the tip of several magnet-embedded soft legs, and were connected to a module that contained a battery-source. FIG. 11A shows a photograph and schematic cross-section, respectively of the soft module containing a lithium ion battery. FIG. 11B shows a photograph and schematic cross-section, respectively of the soft module (leg) containing an LED. The LEDs embedded in soft legs lit up when the strips of aluminum foil on the face of the soft legs came into contact with the reciprocal metal foil connected to a battery-power source (4.5 V) housed in the adjoining unit (FIGS. 11C-11D).

The presence of Al foil in the strain-limiting layer, however, may impede the pneumatic actuation of soft legs. To minimize the interference of metal foil on the actuation of soft modules, a portion of metal foil embedded in the strain-limiting layer was replaced with liquid metal alloy—eutectic gallium-indium (EGain). Substitution of the metal foil with EGain reduced the amount of pressure required for actuation of soft legs, and eliminated the possibility of a broken electrical circuit caused by the tearing of metal foil in the strain-limiting layer during repeated actuation.

Alternatively, a frame for a soft-hard walker can be designed to conduct electricity from the hard body to the soft legs. The supply of electrical current may remain stable to power LEDs when the quadruped is walking.

The utility of magnetic connectors for assembling pneumatically actuated soft robots that have components made of similar or different materials, and those that have complex internal three-dimensional networks of pneumatic channels that are difficult to fabricate as a monolith were demonstrated. These magnetic connectors allowed for rapid, reversible reconfiguration of hybrid soft-hard robots for repair, testing new designs, and carrying out new tasks. Furthermore, combining pneumatic actuators and self-aligning magnetic connectors enabled a teleoperator to assemble and disassemble robots on demand. The capability to modify robots remotely using pneumatics and magnetic connector advances the design, control, and operation of soft-hard robots.

The invention is described with reference to the following examples, which are presented for the purpose of illustration only and are not intended to be limiting of the invention.

Example 1. Fabrication of Soft Legs Embedded with Ring Magnets

Figure 13A:
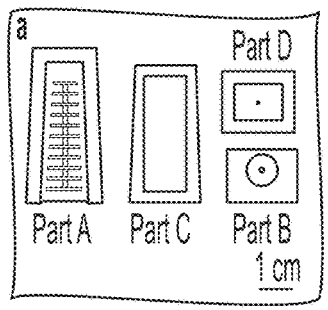
FIGS. 13A-13J show the fabrication of an extensible soft leg according to one or more embodiments.
Figure 13B:
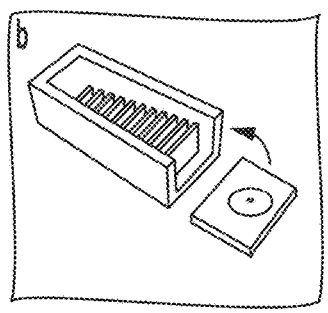
Figure 13C:
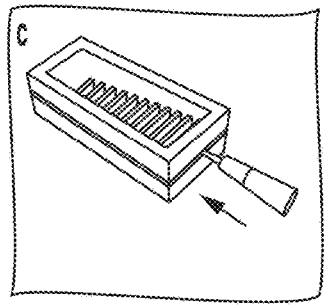
Figure 13D:
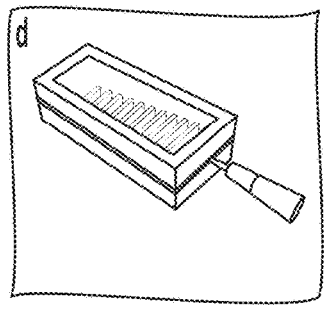
Figure 13E:
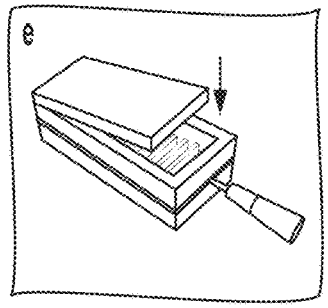
Figure 13F:
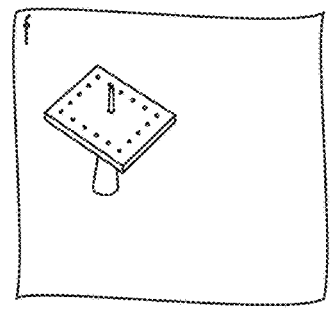
Figure 13G:
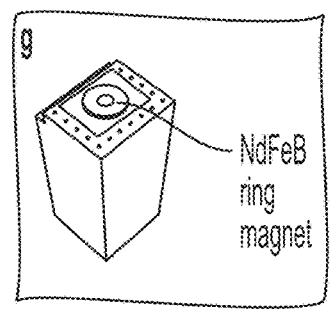
Figure 13H:
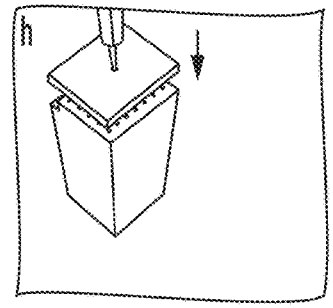
Figure 13I:
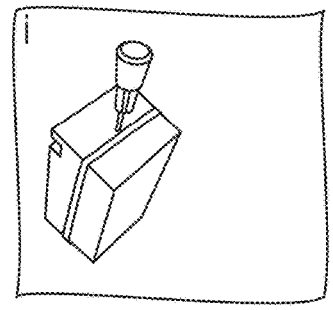
Figure 13J:
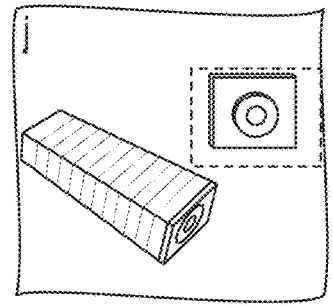

A soft-leg actuator consisted of an extensible layer and a strain-limiting layer. The molds (part-A, -B, -C, and -D) used for fabricating the extensible layer of soft legs are shown in FIG. 13A. Exemplary elastomers include silicone elastomers; exemplary silicone elastomers for the extensible (stretchy) layer include Ecoflex® 0030, Ecoflex® 0050, Elastosil® M4601 and Dragon Skin® 30; exemplary silicone elastomers for the strain-limiting (stiffer) layer include T PDMS Sylgard® 184 and Elastosil® M4601 paper Composite. We assembled the molds for parts-A and -B as indicated in FIG. 13B. A polyethylene tube (dimension: 1.22 mm (O.D.)×0.76 mm (I.D.))—with a 21-gauge needle inside—was inserted through the hole at the center of part-B (FIG. 13C). The tube was used as an air inlet, connecting the internal network of channels in the leg component to an external source of compressed air, for pneumatic actuation. We then filled the assembled mold with liquid prepolymer (FIG. 13D), and degassed the entire assembly for 5 min to remove residual gas bubbles. Next, we added part-C of the top mold (FIG. 13E), and removed excess liquid pre-polymer with a razor blade. In parallel, we filled the part-D mold with another liquid pre-polymer (Dragon Skin® 30), removed the excess pre-polymer with a razor blade, and inserted a polyethylene tube (with a needle inside) through the hole at the center of the mold (FIG. 13F). We cured the liquid pre-polymers that filled the assembled molds (parts-A, -B, and -C) and the part-D mold at 65° C. for 40 min and 10-15 min respectively. Once the curing was complete, the elastomers were cooled to room temperature. Next, we removed the part-B mold along with the tubes and needle in it, and inserted an NdFeB ring magnet of appropriate size to the recess. We coated the face of the extensible layer that housed the ring magnet with additional liquid pre-polymer (Dragon Skin® 30), and placed the thin layer of elastomer (~0.6-1.0 mm)—previously cured and remained attached on the part-D mold—on top to seal the magnet (FIG. 13G-I). The curing process was completed after 4 hrs at room temperature. The extensible layer was removed from the molds and trimmed with a pair of scissors (or razor blade) to remove excess polymer (FIG. 13J). The strain-limiting layer of a soft leg was fabricated from PDMS, based on the following procedure: The base and the curing agent (10:1 w/w) of the liquid pre-polymer of PDMS were mixed, degassed under reduced pressure for 20-30 min to remove gas bubbles, and cast into a glass container to obtain a thickness of ~1-2 mm. After curing at 65° C. for 40-60 min, the PDMS-coated glass container was removed from the oven and cooled to room temperature.

We applied a thin film of liquid pre-polymer of PDMS as glue to seal the network of channels of the extensible layer against the strain-limiting layer. The assembly was initially cured at room temperature for 2-4 hrs, and then at 65° C. for 1 hr to accelerate the curing process. Alternatively, the glue could be cured in a single step at room temperature for 24 hrs. Once the curing was complete, excess PDMS membrane around the soft leg was removed with a razor blade.

Example 2. Procedure for Preparing Spiky Legs with Ring Magnets

The extensible layer of the spiky legs was prepared with the same procedure as described in Example 1 for soft-legs fabrication using a mixture of Ecoflex® 0050 and Dragon Skin® 30 (in the ratio of 7:3 (w/w)). The strain-limiting layer that contained spikes was fabricated using an Objet 3D printer. The spikes were made of hard and rigid plastics, and were directly printed above a thin layer of flexible rubber, incorporated with a regular array of holes. We coated the rubbery base of the strain-limiting layer with PDMS liquid prepolymer and cured it at room temperature overnight (>12 hr). We then sealed the extensible layer of the leg against the PDMS using the same bonding method previously described.

Example 3. Fabrication of Electrically Conductive Legs Embedded with a LED

We inserted an LED into the tip of a magnet-embedded soft leg, and encased a battery-powered source in a magnet-embedded soft manifold to test if the magnetic interface could provide sufficient contact for conducting electricity between two adjacent modules to power up the LED. We then used strips of aluminum foils to connect the battery power source at the center of a soft manifold to the magnetic interface at the periphery (FIG. 11A). FIG. 11A shows a manifold made of soft elastomer (Ecoflex® 0030). Center of the manifold contained a D.C. power source (3×Li battery), which was connected to the periphery of the manifold with strips of aluminum (Al) foil. Inset shows the cross-sectional schematic of the manifold along the line AB. The encased LED in the soft leg was similarly connected to the magnetic interface using strips of aluminum foil sealed within the strain-limiting layer of the actuator (FIG. 11B). FIG. 11B shows the top and the bottom view of the electrically conductive soft legs, embedded with LEDs. Inset shows the longitudinal cross-sectional schematic of the leg. The LEDs embedded in these soft legs lit up when they made physical contact with the central manifold in correct orientation, in which three conductive soft legs were brought into contact with the central manifold and their embedded LEDs lit up (FIG. 11C). In addition, we pneumatically actuated two of the soft legs through the central manifold; the embedded LEDs continued to light up during this actuation (FIG. 11D). This result shows that the electrical contact at the magnetic interface remained sufficiently stable for conducting electricity when the magnetically coupled soft actuators were in motion.

Example 4. Fabrication of Soft Tentacle with Embedded Magnets

The soft tentacles used in this study had one central channel, and four independent side channels, parallel to and equidistant from the channel at the center.

Figure 14A:
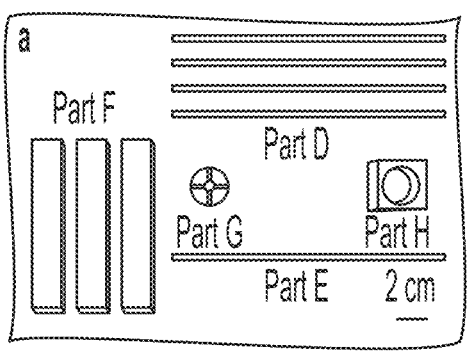
FIGS. 14A-14E shows the assembling of the top and the bottom mold for the fabrication of a soft tentacle, including (a) components of the top mold included four inserts (part-D) for creating the side channels, one insert (part-E) for creating the central channel, three arched-shape inserts (part-F) that combined to form a cylindrical wall, a ring holder (part-G) used for aligning part-E at the center of the final assembly, and a cap holder (part-H) for maintaining a constant distance between part-E and the four part-D molds; (b) bottom-mold assembly filled with liquid prepolymer; (c) parts-D (×4), -E (×1), and -F (×2) were inserted into the bottom-mold assembly filled with liquid pre-polymer. (d) The assembly was tilted 90°, and immediately filled with liquid pre-polymer. (e) Part-F mold filled with liquid pre-polymer was inserted in the combined molds as shown in image (d), and the assembly was immediately reverted back to its vertical position.
Figure 14B:
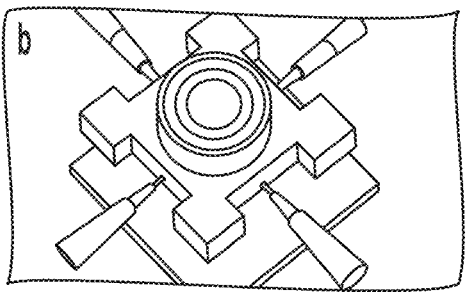
Figure 14C:
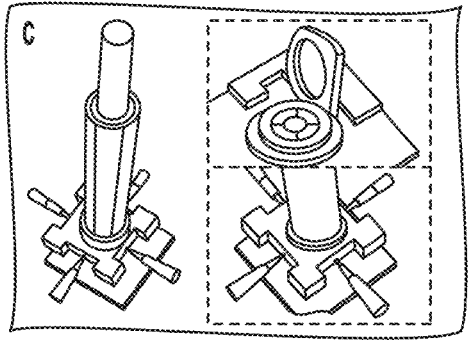
Figure 14D:
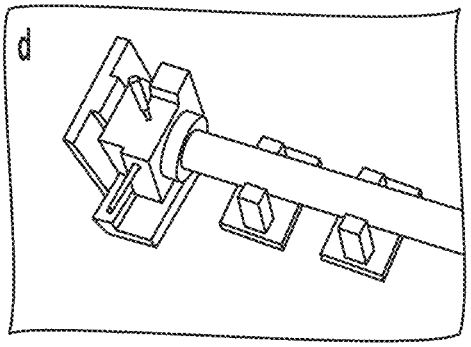
Figure 14E:
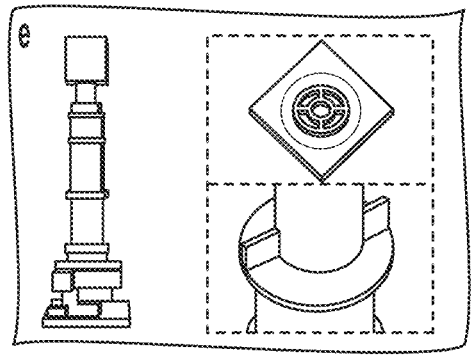

We mixed the liquid pre-polymer of Ecoflex® 0050 and Dragon Skin® 30 at a ratio of 4:6 (w/w) (~60 g in total), and degassed the mixture at a reduced pressure for 3 min to remove bubbles. We filled the "bottom mold" assembly (parts-A (×1), -B(×1), and -C (×4)) with the liquid prepolymer (highly viscous), degassed it for 2 min, and repeated the degassing step one more time to remove residual bubbles. Additional molds (parts-D (×4), -E(×1), and -F (×2)) (FIG. 14A) were inserted in the bottom assembly, as shown in FIG. 14B. The assembled mold was then tilted 90°, and quickly filled with an excess of liquid pre-polymer to cover all of the part-D molds in the assembly (FIG. 14C). Needles were inserted on four sides of part-B to align the through-holes on parts-A, -B, -C, and -D, and were used for creating air inlets for the side channels. Inset at the bottom right corner shows an expanded view of the molds. Inset at the top right corner shows an assembly without part-B, which was removed for clarity to show the molding alignment of parts-A, -C, and -D with one of the needles. We degassed the assembly for 1 min and refilled it with more liquid pre-polymer. After repeating the degassing and the refilling step one more time, we combined the assembled mold with part-F, already filled with the same liquid prepolymer, and quickly tilted the entire assembly back to its vertical position. We inserted parts- G and -H to complete the assembly of the molds (FIG. 14D). Parts-G and -H were sequentially added to complete the assembly. Insets at the bottom and the top right corners show an expanded view of part-G and -H respectively. The pre-polymer-filled assembly was initially cured for 1 hr at room temperature, and we periodically refilled with additional liquid pre-polymer to compensate for the leakage from gaps between individual parts of the mold. After curing for 40-60 min at 65° C., the mold was disassembled. The part-E mold was retained in the central channel for the next step.

Figure 15A:
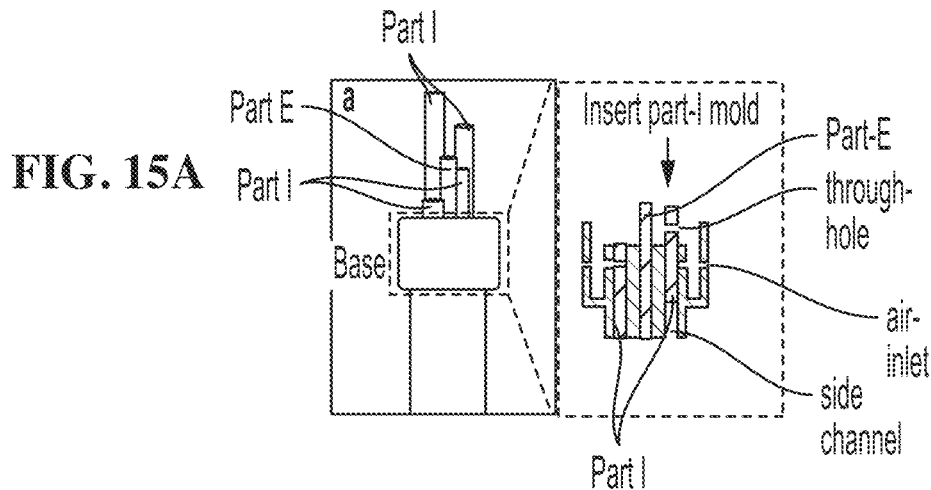
FIGS. 15A-15E illustrates a process for embedding magnets in soft tentacle, including photograph and corresponding longitudinal cross-section schematics of tentacles, including (A) part-I molds (total of four) inserted into the side channels of the tentacles, and the through-holes aligned with the air-inlets of the side channels at the base; (B) four NdFeB ring magnets inserted into the pockets of the base, filled with liquid pre-polymer; (C) Needles inserted to align the air-inlets of the tentacle, the though-holes of the part-I molds, and the center of the ring magnets; (D) Expanded top view of a tentacle purposed for a flexible optical sensor; and (E) a NdFeB ring magnet inserted into the top of a tentacle intended for magnetic coupling with a magnet-embedded soft gripper.
Figure 15B:
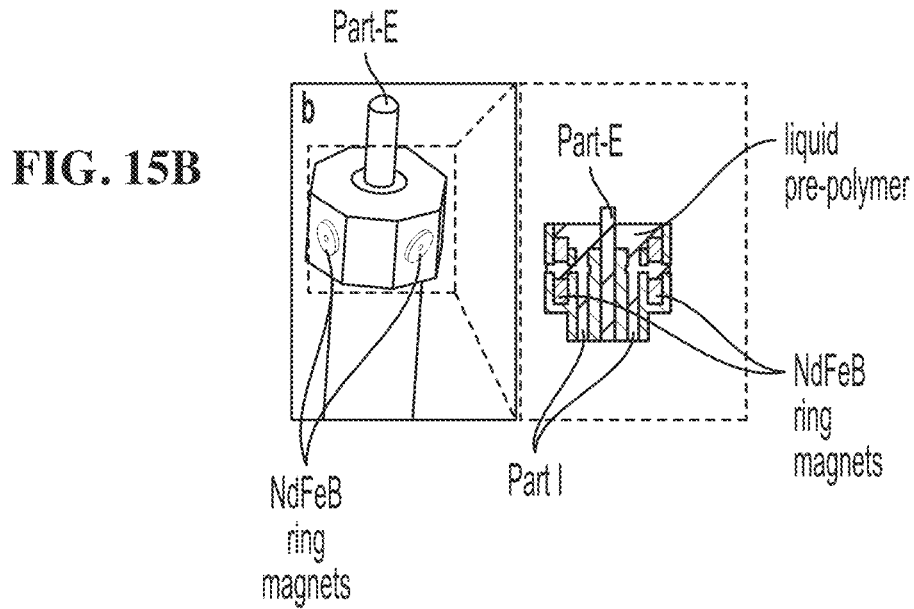
Figure 15C:
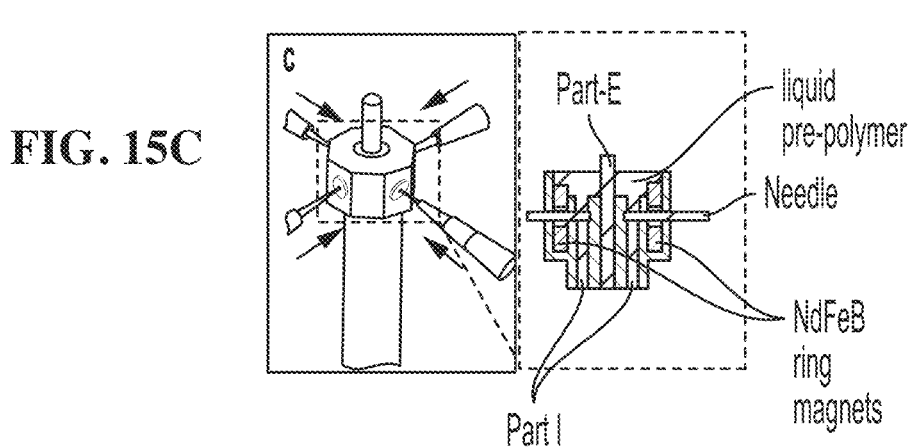

We inserted part-I molds (×4) into the empty side channels of the tentacle (FIG. 15A). Each of the part-I molds had a through-hole at one end, and each through-hole was aligned with the air-inlet of a side channel. After alignment, we filled the base of the tentacle with liquid pre-polymer for Dragon Skin® 30, and immediately placed four ring magnets (dimension: ¼" (O.D.)×⅛" (I.D.)×0.1" (thickness)) in the designated recesses (FIG. 15B). We inserted a needle through the hollow center of each ring magnet while the prepolymer was still in liquid form, and gently rested the pointed tip of the needle inside the through-hole of part-I mold without piercing the wall of the central channel (FIG. 15C). We then cured the assembly for 4 hours at room temperature and removed part-I molds and the needles from the assembly.

Flexible Optical Sensor

Figure 15D:
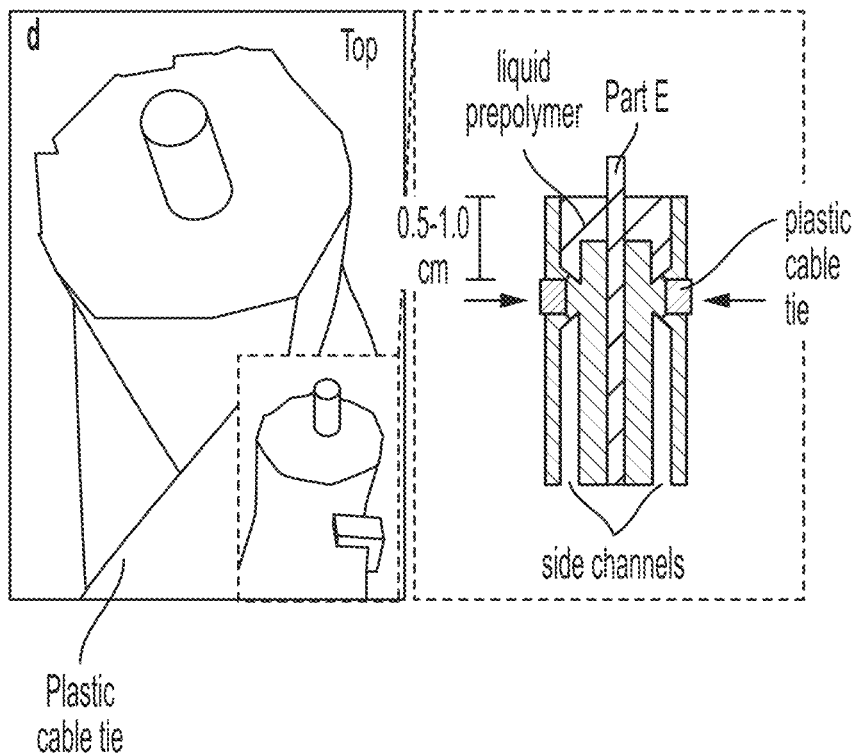
Figure 15E:
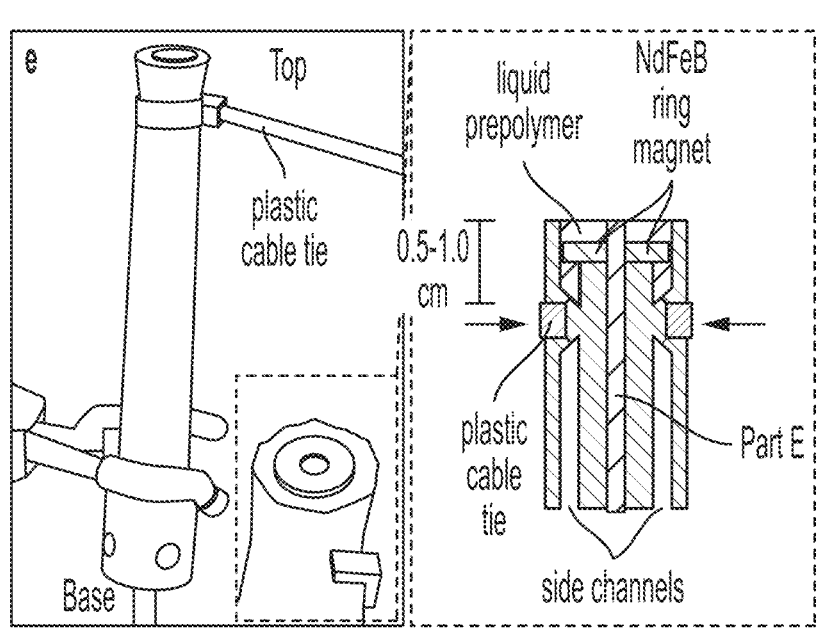

After sealing the ring magnets at the base with elastomer, we tightened a plastic cable tie 0.5-1.0 cm below the top of the tentacle to constrict sections of the side channels temporarily. The top openings of these side channels were subsequently filled with liquid prepolymer (Dragon Skin® 30). FIG. 15D shows an expanded top view of a tentacle purposed for a flexible optical sensor. The bottom inset shows the top opening of the constricted side channels, when filled with liquid pre-polymer. After curing for 30-45 min at 65° C., the cable tie was removed with a pair of scissors. We completed the fabrication of the flexible optical sensor, by replacing part-E at the central channel with a miniature color CMOS video camera (Supercircuits, Inc.). FIG. 15E shows an NdFeB ring magnet was inserted into the top of a tentacle intended for magnetic coupling with a magnet-embedded soft gripper. Inset shows the top expanded view of the tentacle embedded with an NdFeB ring magnet.

Tentacle-Gripper

After sealing the ring magnets at the base of a soft tentacle with elastomer, we displaced the part-E mold downward, to ~0.5-1.0 cm below the top of the tentacle. We then constricted the top portion of both the central and the side channels by tightening the tentacle with a plastic cable tie, and filled the top opening with the Dragon Skin® 30 liquid prepolymer. A ring magnet, with dimensions of ⅛" (O.D.)× ⅜" (I.D.)×0.06" (thickness), was subsequently placed at the apex of the tentacle (Figure S9e), and then sealed with additional Dragon Skin® 30 liquid pre-polymer. The assembly was then cured at 65° C. for 30-45 min in order to seal the ring magnet and the top opening of each channel. After curing was complete, we removed the plastic cable tie and used a with a long needle (O.D.: 0.90 mm) to pierce through the central channel (careful not to puncture the side channels) from the top. The inserted needle was used as a temporary template to guide the insertion of a polyethylene tube (I.D.: 1.14 mm; O.D.: 1.57 mm; length: 15 mm) through the central channel. Following the insertion of the entire length polyethylene tube and having one of its ends embedded at the top, we removed the needle, and thus, completed the fabrication of the tentacle for magnetic coupling with a soft gripper.

Figure 17:
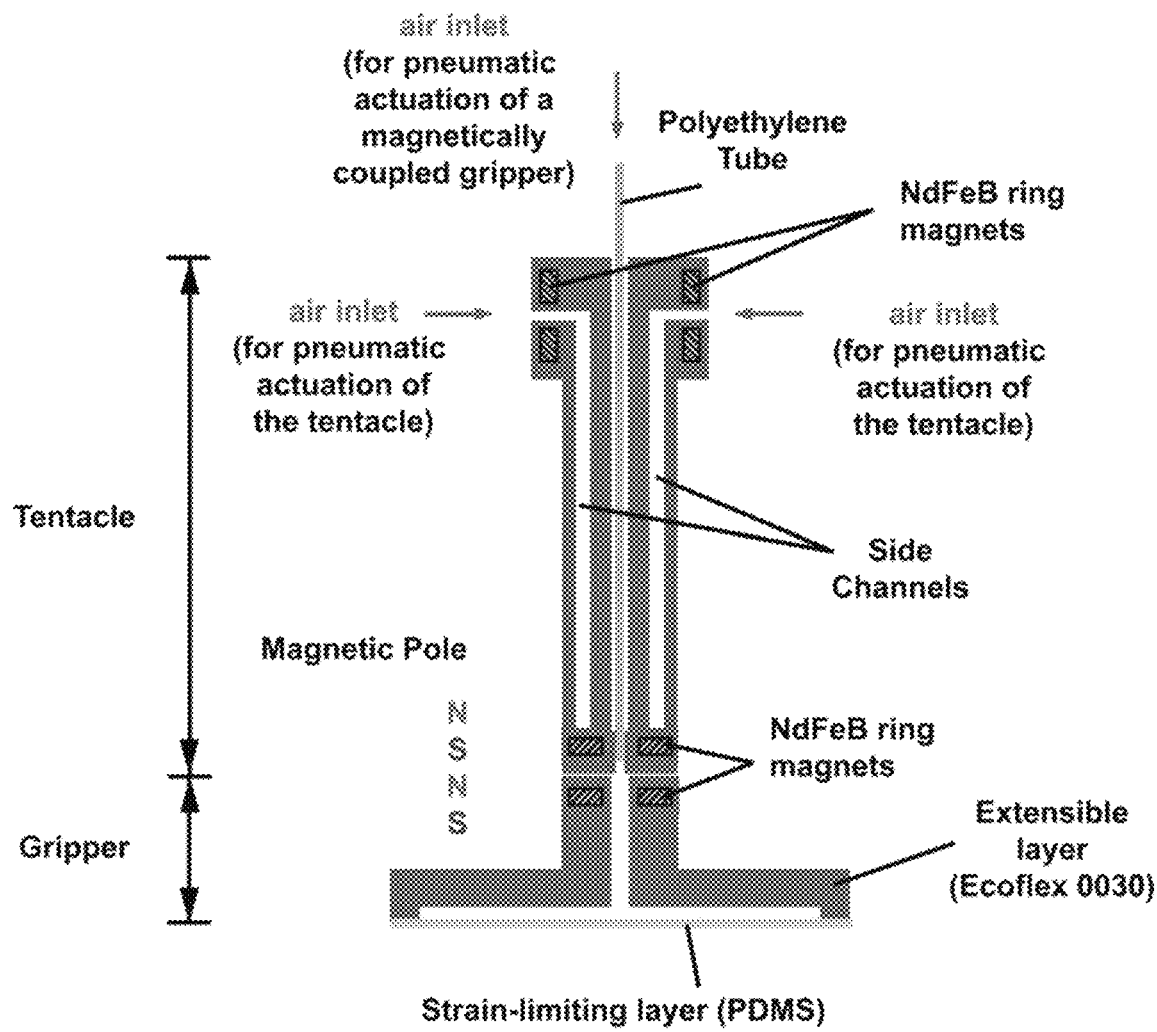
FIG. 17 a cross-section schematic of a tentacle-gripper, as viewed from the side parallel to the longitudinal axis.

Cross-sectional schematics of both tentacles and a magnetically coupled tentacle-gripper are shown in FIG. 16 and FIG. 17, respectively. FIG. 16 illustrates longitudinal cross sectional schematics of (a) a soft tentacle purposed as a flexible optical sensor, and (b) a soft tentacle intended for magnetic coupling with a soft gripper. Each tentacle was designed with four side channels and a central channel; all channels were designed parallel to one another, and their length spanned across the longitudinal axis of the tentacles. The insets between Panels (a) and (b) show cross-sectional schematics perpendicular to the central axis of the tentacles. The top and middle insets show schematics of the tentacles, as viewed from the top. The magnet embedded at the top of tentacle as shown in image (b) was used for coupling with a magnet-embedded actuator (e.g., a soft gripper). The base of both tentacles shared the same design, as shown in the bottom inset. The base of a tentacle had four embedded NdFeB ring magnets; the center of each ring magnet was aligned with the opening of the air inlet of a side channel. (c) Longitudinal cross-sectional schematic of a soft tentacle mounted with a CMOS video camera in the central channel. (d) Longitudinal cross-section schematic of a soft tentacle inserted with a polyethylene tube. The tube was used for the pneumatic actuation of a magnetically coupled soft gripper. FIG. 17 shows a cross-section schematic of a tentacle-gripper, as viewed from the side parallel to the longitudinal axis. Ring magnets embedded in the soft tentacle and the soft gripper attracted one to another and aligned the central pneumatic channels. Compressed air was delivered through the polyethylene tube, inserted at the central channel of the tentacle to actuate the soft gripper pneumatically.

Example 5. Design and Fabrication of Hard Structural Modules

In this study, we designed and fabricated four different hard structural elements from ABS using 3D printing. These different modules included 1) a hexagonal frame, 2) six side magnetic connectors, 3) two magnetic containers, and 4) a central magnetic connector.

1. Hexagonal Frame

The hard hexagonal frame (FIG. 9A) served as the main scaffold and central body of the modular robot. This frame consisted of one hollow center and six side sockets (FIG. 9A); each was designed for tightly fitted connections with other hard magnetic connectors (one for the center and the other six for the side sockets) of matching dimensions and shapes (FIGS. 9A-9C). Four of the side sockets were used for coupling with the soft legs of quadruped walker, while the two remaining side sockets could provide further opportunities for introducing additional soft actuators, or different modules (e.g., container) for new functions (e.g., storage).

2. Hard Connectors

We designed a side connector, termed the "hard connector", as an adaptor for connecting a soft leg to the central body (hexagonal frame) of a hybrid soft-hard robot. One side of the hard connector housed a NdFeB ring for attaching magnet-embedded soft legs while the opposite face of the connector fit and mechanically locked into the side socket of the hexagonal frame. An open channel that passed through the center of the embedded ring magnet connected these two faces and served as the air inlet for pneumatic actuation of a magnetically attached soft actuator (FIGS. 9D-9F). The depth of the pocket for embedding a ring magnet was designed to be ~0.5-1.0 mm shorter than the thickness of the ring magnet to ensure that the top face of the ring magnet would always remain in direct physical contact with the magnetic face of a soft actuator. We also cured a thin film of Ecoflex® 0030, coating around the through-hole of the hard connector. The coating minimized the leakage of gas from the porous surface of ABS thermoplastics and allowed a more efficient system of gas transfer during the pneumatic actuation of a coupled soft actuator.

3. Hard Containers

To facilitate the transportation of centimeter-sized objects using hybrid robots, we fabricated hard containers and embedded them with ring magnet to allow for them to be reversibly assembled with the hard connectors, attached to the body (i.e., the hexagonal frame) of a hybrid robot (FIG. 9G-9I).

4. Central Connector

Figure 18A:
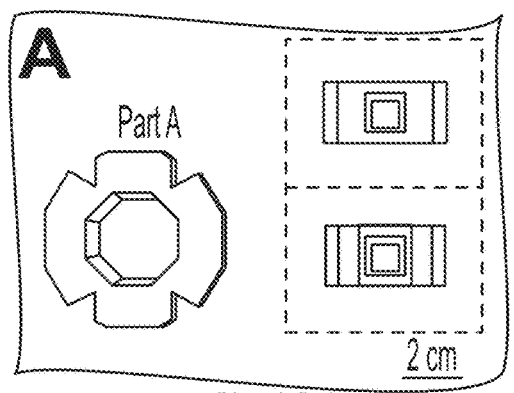
FIGS. 18A-18H illustrates the assembly of the central connector for anchoring soft tentacle consisting of four different parts including (a) a central hub with four open channels connecting the hollow center to the periphery of the connector, and a rectangular recess on each of the four faces of its periphery; (b) bridge adaptor with a complementary peg (highlighted in red-dashed box) that fit with each of the four rectangular recesses on the periphery of the central connector; (c) holder that housed a ring magnet (dimension of the ring magnet: ¼" (O.D.)×⅛" (I.D.)×0.1" (thickness)) on one side, with a polyethylene tube inserted at its central channel; and (d) cap that confined the magnet holder in each of the four open channels of the central connector. Insets of Panels a-c show the various parts of the central connector, as viewed from different angles. (e) Connecting four bridge adaptors to the periphery of the central connector through peg-and-recess joints. Four magnet holders were (f) inserted and (g) confined inside the open channels of the central connector. (h) A fully assembled central connector.
Figure 18E:
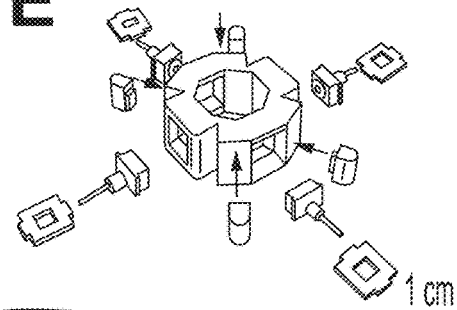
Figure 18B:
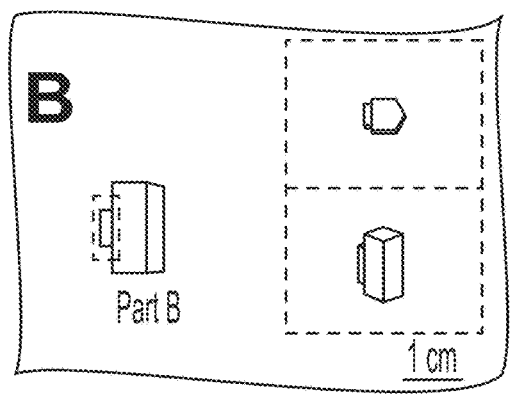
Figure 18F:
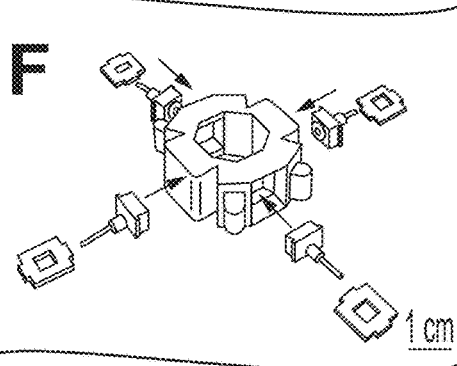
Figure 18C:
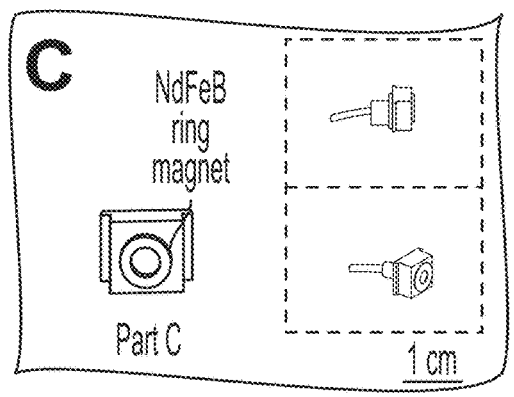
Figure 18G:
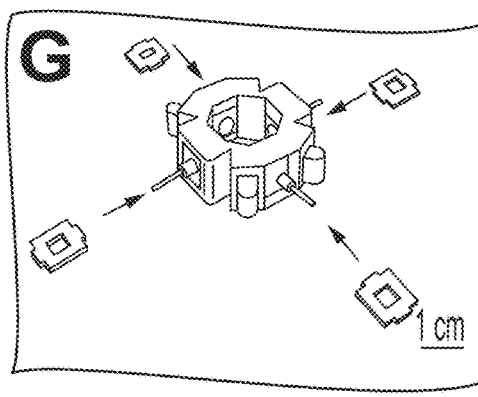
Figure 18D:
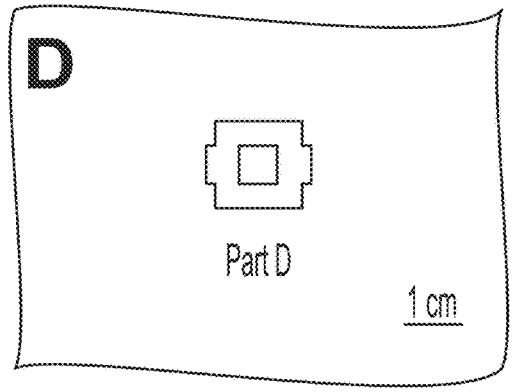
Figure 18H:
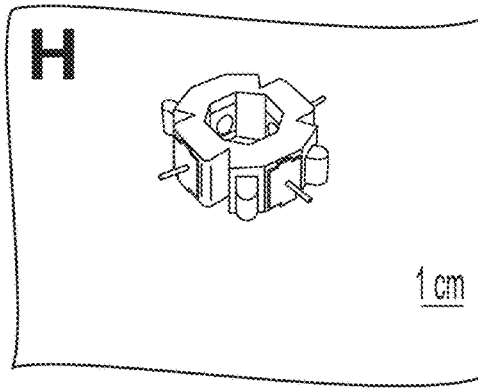

We designed and fabricated a central magnetic connector (FIG. 18A) for connecting a soft tentacle to the center of the hexagonal frame of a hybrid robot, and introduced four bridge adaptors (FIG. 18B) on the periphery of the central connector to fit tightly with the interior of the hard hexagonal frame (FIGS. 18B and 18E). An array of four NdFeB ring magnets—held in four small holders (FIGS. 18c and 18F)—were placed around the hollow center of the central connector for attracting a complementary set of ring magnets embedded in the soft tentacles. These holders were designed to be sufficiently large so that they could be capped and confined inside the open channels of the central connector (FIGS. 18D and 18G), but small enough so that their movement within the channels remained unhindered. Polyethylene tubes were inserted at the back of the magnet holders to serve as the air inlets for pneumatic actuation of the attached soft tentacle. Similar to the design of the hard connector, the pocket for housing the ring magnet was made ~0.5-1.0 mm shallower than the thickness of the ring magnet, and Ecoflex® 0030 was applied to coat the central channel of these four magnet holders.

Example 6. Fabrication of an Inflatable Connector

Figure 19A:
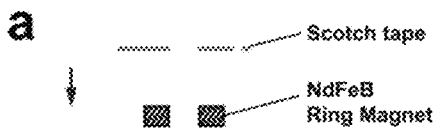
FIGS. 19A-19E are schematics of the procedures for fabricating an inflatable connector according to one or more embodiments.
Figure 19B:
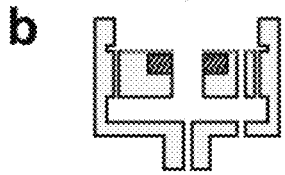
Figure 19C:
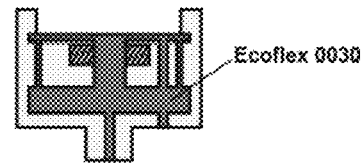
Figure 19D:
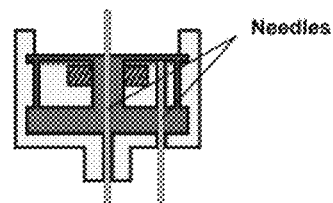
Figure 19E:
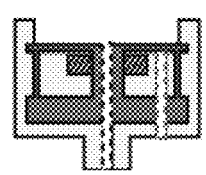

We inserted a ring magnet (⅜" (O.D.)×⅛" (I.D.)×0.06" (thickness)) into the designated pocket of an inflatable connector, and adhered single-sided Scotch tape on top of the magnet (FIGS. 19A and 19B). The Scotch tape had two holes; both the locations and the diameters of these holes matched with those of the ring magnet and the side channel of the connector. We then filled the internal channels of the connector with liquid pre-polymer Ecoflex® 0030 (FIG. 19C). After degassing the entire assembly under reduced pressure for 3 min to remove bubbles, we inserted two polyethylene tubes (with needles inside) in the central and the side channels (FIG. 19D). After curing the pre-polymer for 4 hrs, we removed the tubes along with the needles, and trimmed off excess polymer with a razor blade (FIG. 19E). The piece of Scotch tape prevented the liquid polymer from curing within the micropores on the surface face of the connector that housed the magnet; thus, the thin membrane of elastomer above the magnet could be readily inflated when pressurized with compressed air. FIGS. 2F-2I show the actuation of the membrane of the inflatable connector when attached to a source of compressed air via the side channel.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A reconfigurable robotic device, comprising:
 a flexible body capable of actuation upon pressurization and comprising:
  (a) at least one channel disposed within the flexible body in fluidic communication with a first inlet, and
  (b) a first magnet disposed within the flexible body and positioned about the first inlet; and
 a hard component comprising:
  (a) a rigid body comprising a second inlet, and
  (b) a second magnet positioned about the second inlet;
 wherein the first and second magnets align the first inlet and the second inlet to form a continuous conduit and an air-tight seal between the flexible body and hard component,
 wherein the rigid body of the hard component defines a cavity having walls and a floor that is sized to accommodate an end of the flexible body comprising the first inlet, and
 wherein the second magnet is located in the walls of the cavity.

2. A method of assembling the reconfigurable robotic device of claim 1 comprising:
 providing the flexible body capable of actuation upon pressurization and comprising
  (a) the at least one chamber disposed within the flexible body in fluidic communication with the first inlet, and (b) the first magnet disposed within the flexible body and positioned about the first inlet; and providing the hard component comprising
   (a) the rigid body comprising the second inlet, and
   (b) the second magnet positioned about the second inlet;

aligning the first inlet and the second inlet;

forming the continuous conduit and the air-tight seal between the flexible body and hard component, wherein the rigid body of the hard component defines the cavity having walls and a floor that is sized to accommodate the end of the flexible body comprising the first inlet, and wherein the second magnet is located in the walls of the cavity.

* * * * *